(12) United States Patent
McBride et al.

(10) Patent No.: US 8,733,095 B2
(45) Date of Patent: May 27, 2014

(54) SYSTEMS AND METHODS FOR EFFICIENT PUMPING OF HIGH-PRESSURE FLUIDS FOR ENERGY

(71) Applicant: SustainX, Inc., Seabrook, NH (US)

(72) Inventors: Troy O. McBride, Norwich, VT (US); Benjamin R. Bollinger, Topsfield, MA (US); Michael Neil Scott, West Lebanon, NH (US); Robert Cook, West Lebanon, NH (US); Patrick J. Magari, Plainfield, NH (US)

(73) Assignee: Sustainx, Inc., Seabrook, NH (US)

( * ) Notice: Subject to any disclaimer, the term of this patent is extended or adjusted under 35 U.S.C. 154(b) by 0 days.

(21) Appl. No.: 13/727,015

(22) Filed: Dec. 26, 2012

(65) Prior Publication Data

US 2013/0160437 A1    Jun. 27, 2013

Related U.S. Application Data

(63) Continuation of application No. 13/009,409, filed on Jan. 19, 2011, now Pat. No. 8,359,856, which is a continuation-in-part of application No. 12/639,703, filed on Dec. 16, 2009, now Pat. No. 8,225,606, which is a continuation-in-part of application No. 12/421,057, filed on Apr. 9, 2009, now Pat. No. 7,832,207, and a continuation-in-part of application No. 12/481,235, filed on Jun. 9, 2009, now Pat. No. 7,802,426.

(60) Provisional application No. 61/166,448, filed on Apr. 3, 2009, provisional application No. 61/043,630, filed on Apr. 9, 2008, provisional application No. 61/148,691, filed on Jan. 30, 2009, provisional application No. 61/184,166, filed on Jun. 4, 2009, provisional application No. 61/059,964, filed on Jun. 9, 2008, provisional application No. 61/223,564, filed on Jul. 7, 2009, provisional application No. 61/227,222, filed on Jul. 21, 2009, provisional application No. 61/251,965, filed on Oct. 15, 2009, provisional application No. 61/328,345, filed on Apr. 27, 2010.

(51) Int. Cl.
| | | |
|---|---|---|
| F01K 21/04 | (2006.01) |
| F01B 29/00 | (2006.01) |
| F16D 31/02 | (2006.01) |
| F04B 17/00 | (2006.01) |
| F04B 35/00 | (2006.01) |
| F04B 35/04 | (2006.01) |
| F04B 17/04 | (2006.01) |

(52) U.S. Cl.
USPC ............... 60/511; 60/512; 60/408; 60/417; 417/398; 417/418

(58) Field of Classification Search
USPC .......... 60/407–418, 508, 511–515, 645–681; 417/267, 314, 398–404
See application file for complete search history.

(56) References Cited

U.S. PATENT DOCUMENTS

| 114,297 A | 5/1871 | Ivens et al. |
| 224,081 A | 2/1880 | Eckart |

(Continued)

FOREIGN PATENT DOCUMENTS

| BE | 898225 | 3/1984 |
| BE | 1008885 | 8/1996 |

(Continued)

OTHER PUBLICATIONS

"Hydraulic Transformer Supplies Continuous High Pressure," Machine Design, Penton Media, vol. 64, No. 17, (Aug. 1992), 1 page.

(Continued)

*Primary Examiner* — Christopher Jetton
(74) *Attorney, Agent, or Firm* — Occhiuti & Rohlicek LLP

(57) ABSTRACT

In various embodiments, a mechanical assembly and/or storage vessel is fluidly coupled to a circulation apparatus for receiving pressurized heat-transfer fluid from an outlet at a first elevated pressure, boosting a pressure of the heat-transfer fluid to a second pressure larger than the first pressure, and returning heat-transfer fluid to an inlet at a third pressure.

17 Claims, 7 Drawing Sheets

(56) References Cited

U.S. PATENT DOCUMENTS

| | | |
|---|---|---|
| 233,432 A | 10/1880 | Pitchford |
| 1,353,216 A | 9/1920 | Carlson |
| 1,635,524 A | 7/1927 | Aikman |
| 2,141,703 A | 12/1938 | Bays |
| 2,280,100 A | 4/1942 | SinQleton |
| 2,280,845 A | 4/1942 | Parker |
| 2,391,078 A | 12/1945 | Thomsen |
| 2,404,660 A | 7/1946 | Rouleau |
| 2,420,098 A | 5/1947 | Rouleau |
| 2,486,081 A | 10/1949 | Weenen |
| 2,539,862 A | 1/1951 | Rushinq |
| 2,628,564 A | 2/1953 | Jacobs |
| 2,632,995 A | 3/1953 | Noe |
| 2,712,728 A | 7/1955 | Lewis et al. |
| 2,813,398 A | 11/1957 | Wilcox |
| 2,829,501 A | 4/1958 | Walls |
| 2,880,759 A | 4/1959 | Wisman |
| 3,041,842 A | 7/1962 | Heinecke |
| 3,100,965 A | 8/1963 | Blackburn |
| 3,192,705 A | 7/1965 | Miller |
| 3,236,512 A | 2/1966 | Caslav et al. |
| 3,237,847 A | 3/1966 | Wilson |
| 3,269,121 A | 8/1966 | Ludwig |
| 3,538,340 A | 11/1970 | LanQ |
| 3,608,311 A | 9/1971 | Roesel, Jr. |
| 3,648,458 A | 3/1972 | McAlister |
| 3,650,636 A | 3/1972 | Eskeli |
| 3,672,160 A | 6/1972 | Kim |
| 3,677,008 A | 7/1972 | Koutz |
| 3,704,079 A | 11/1972 | Berlyn |
| 3,750,391 A | 8/1973 | Roblyer |
| 3,757,517 A | 9/1973 | RiQollot |
| 3,793,848 A | 2/1974 | Eskeli |
| 3,801,793 A | 4/1974 | Goebel |
| 3,803,847 A | 4/1974 | McAlister |
| 3,839,863 A | 10/1974 | Frazier |
| 3,847,182 A | 11/1974 | Greer |
| 3,895,493 A | 7/1975 | Riqollot |
| 3,903,696 A | 9/1975 | Carman |
| 3,935,469 A | 1/1976 | Haydock |
| 3,939,356 A | 2/1976 | Loane |
| 3,942,323 A | 3/1976 | Maillet |
| 3,945,207 A | 3/1976 | Hyatt |
| 3,948,049 A | 4/1976 | Ohms et al. |
| 3,952,516 A | 4/1976 | Lapp |
| 3,952,723 A | 4/1976 | Browning |
| 3,958,899 A | 5/1976 | Coleman, Jr. et al. |
| 3,986,354 A | 10/1976 | Erb |
| 3,988,592 A | 10/1976 | Porter |
| 3,988,897 A | 11/1976 | Strub |
| 3,990,246 A | 11/1976 | Wilmers |
| 3,991,574 A | 11/1976 | Frazier |
| 3,996,741 A | 12/1976 | Herberg |
| 3,998,049 A | 12/1976 | McKinley et al. |
| 3,999,388 A | 12/1976 | Nystrom |
| 4,008,006 A | 2/1977 | Bea |
| 4,027,993 A | 6/1977 | Wolff |
| 4,030,303 A | 6/1977 | Kraus et al. |
| 4,031,702 A | 6/1977 | Burnett et al. |
| 4,031,704 A | 6/1977 | Moore et al. |
| 4,041,708 A | 8/1977 | Wolff |
| 4,050,246 A | 9/1977 | Bourquardez |
| 4,055,950 A | 11/1977 | Grossman |
| 4,055,951 A | 11/1977 | Davoud et al. |
| 4,058,979 A | 11/1977 | Germain |
| 4,075,844 A | 2/1978 | Schiferli |
| 4,089,744 A | 5/1978 | Cahn |
| 4,092,830 A | 6/1978 | Rilett |
| 4,094,356 A | 6/1978 | Ash et al. |
| 4,095,118 A | 6/1978 | Rathbun |
| 4,100,745 A | 7/1978 | Gyarmathy et al. |
| 4,104,955 A | 8/1978 | Murphy |
| 4,108,077 A | 8/1978 | Laing |
| 4,109,465 A | 8/1978 | Plen |
| 4,110,987 A | 9/1978 | Cahn et al. |
| 4,112,311 A | 9/1978 | Theyse |
| 4,117,342 A | 9/1978 | Melley, Jr. |
| 4,117,696 A | 10/1978 | Fawcett et al. |
| 4,118,637 A | 10/1978 | Tackett |
| 4,124,182 A | 11/1978 | Loeb |
| 4,126,000 A | 11/1978 | Funk |
| 4,136,432 A | 1/1979 | Melley, Jr. |
| 4,142,368 A | 3/1979 | Mantegani |
| 4,147,204 A | 4/1979 | Pfenninger |
| 4,149,092 A | 4/1979 | Cros |
| 4,150,547 A | 4/1979 | Hobson |
| 4,154,292 A | 5/1979 | Herrick |
| 4,167,372 A | 9/1979 | Tackett |
| 4,170,878 A | 10/1979 | Jahniq |
| 4,173,431 A | 11/1979 | Smith |
| 4,189,925 A | 2/1980 | Long |
| 4,194,889 A | 3/1980 | Wanner |
| 4,195,481 A | 4/1980 | Gregory |
| 4,197,700 A | 4/1980 | Jahniq |
| 4,197,715 A | 4/1980 | Fawcett et al. |
| 4,201,514 A | 5/1980 | Huetter |
| 4,204,126 A | 5/1980 | Diggs |
| 4,206,608 A | 6/1980 | Bell |
| 4,209,982 A | 7/1980 | Pitts |
| 4,220,006 A | 9/1980 | Kindt |
| 4,224,799 A | 9/1980 | Rilett |
| 4,229,143 A | 10/1980 | Pucher |
| 4,229,661 A | 10/1980 | Mead et al. |
| 4,232,253 A | 11/1980 | Mortelmans |
| 4,237,692 A | 12/1980 | Ahrens et al. |
| 4,242,878 A | 1/1981 | Brinkerhoff |
| 4,246,978 A | 1/1981 | Schulz et al. |
| 4,262,735 A | 4/1981 | Courrege |
| 4,273,514 A | 6/1981 | Shore et al. |
| 4,274,010 A | 6/1981 | Lawson-tancred |
| 4,275,310 A | 6/1981 | Summers et al. |
| 4,281,256 A | 7/1981 | Ahrens et al. |
| 4,293,323 A | 10/1981 | Cohen |
| 4,299,198 A | 11/1981 | Woodhull |
| 4,302,684 A | 11/1981 | Gogins |
| 4,304,103 A | 12/1981 | Hamrick |
| 4,311,011 A | 1/1982 | Lewis |
| 4,316,096 A | 2/1982 | Syverson |
| 4,317,439 A | 3/1982 | Emmerling |
| 4,335,867 A | 6/1982 | Bihlmaier |
| 4,340,822 A | 7/1982 | Gregg |
| 4,341,072 A | 7/1982 | Clyne |
| 4,348,863 A | 9/1982 | Taylor et al. |
| 4,353,214 A | 10/1982 | Gardner |
| 4,354,420 A | 10/1982 | Bianchetta |
| 4,355,956 A | 10/1982 | Ringrose et al. |
| 4,358,250 A | 11/1982 | Payne |
| 4,367,786 A | 1/1983 | Hafner et al. |
| 4,368,692 A | 1/1983 | Kita |
| 4,368,775 A | 1/1983 | Ward |
| 4,370,559 A | 1/1983 | Langley, Jr. |
| 4,372,114 A | 2/1983 | Burnham |
| 4,375,387 A | 3/1983 | deFilippi et al. |
| 4,380,419 A | 4/1983 | Morton |
| 4,392,062 A | 7/1983 | Bervig |
| 4,393,752 A | 7/1983 | Meier |
| 4,411,136 A | 10/1983 | Funk |
| 4,416,114 A | 11/1983 | Martini |
| 4,421,661 A | 12/1983 | Claar et al. |
| 4,428,711 A | 1/1984 | Archer |
| 4,435,131 A | 3/1984 | Ruben |
| 4,444,011 A | 4/1984 | Kolin |
| 4,446,698 A | 5/1984 | Benson |
| 4,447,738 A | 5/1984 | Allison |
| 4,449,372 A | 5/1984 | Rilett |
| 4,452,046 A | 6/1984 | Valentin |
| 4,452,047 A | 6/1984 | Hunt et al. |
| 4,454,429 A | 6/1984 | Buonome |
| 4,454,720 A | 6/1984 | Leibowitz |
| 4,455,834 A | 6/1984 | Earle |
| 4,462,213 A | 7/1984 | Lewis |
| 4,474,002 A | 10/1984 | Perry |
| 4,476,851 A | 10/1984 | Brugger et al. |
| 4,478,553 A | 10/1984 | Leibowitz et al. |

(56) References Cited

U.S. PATENT DOCUMENTS

| | | |
|---|---|---|
| 4,489,554 A | 12/1984 | Otters |
| 4,491,739 A | 1/1985 | Watson |
| 4,492,539 A | 1/1985 | Specht |
| 4,493,189 A | 1/1985 | Slater |
| 4,496,847 A | 1/1985 | Parkings |
| 4,498,848 A | 2/1985 | Petrovsky |
| 4,502,284 A | 3/1985 | Chrisoghilos |
| 4,503,673 A | 3/1985 | Schachle |
| 4,514,979 A | 5/1985 | Mohr |
| 4,515,516 A | 5/1985 | Perrine et al. |
| 4,520,840 A | 6/1985 | Michel |
| 4,525,631 A | 6/1985 | Allison |
| 4,530,208 A | 7/1985 | Sato |
| 4,547,209 A | 10/1985 | Netzer |
| 4,574,592 A | 3/1986 | Eskeli |
| 4,585,039 A | 4/1986 | Hamilton |
| 4,589,475 A | 5/1986 | Jones |
| 4,593,202 A | 6/1986 | Dickinson |
| 4,619,225 A | 10/1986 | Lowther |
| 4,624,623 A | 11/1986 | Wagner |
| 4,648,801 A | 3/1987 | Wilson |
| 4,651,525 A | 3/1987 | Cestero |
| 4,653,986 A | 3/1987 | Ashton |
| 4,671,742 A | 6/1987 | Gyimesi |
| 4,676,068 A | 6/1987 | Funk |
| 4,679,396 A | 7/1987 | Heggie |
| 4,691,524 A | 9/1987 | Holscher |
| 4,693,080 A | 9/1987 | Van Hooff |
| 4,706,456 A | 11/1987 | Backe |
| 4,707,988 A | 11/1987 | Palmers |
| 4,710,100 A | 12/1987 | Laing et al. |
| 4,735,552 A | 4/1988 | Watson |
| 4,739,620 A | 4/1988 | Pierce |
| 4,760,697 A | 8/1988 | Heggie |
| 4,761,118 A | 8/1988 | Zanarini |
| 4,765,142 A | 8/1988 | Nakhamkin |
| 4,765,143 A | 8/1988 | Crawford et al. |
| 4,767,938 A | 8/1988 | Bervig |
| 4,792,700 A | 12/1988 | Ammons |
| 4,849,648 A | 7/1989 | Longardner |
| 4,870,816 A | 10/1989 | Nakhamkin |
| 4,872,307 A | 10/1989 | Nakhamkin |
| 4,873,828 A | 10/1989 | Laing et al. |
| 4,873,831 A | 10/1989 | Dehne |
| 4,876,992 A | 10/1989 | Sobotowski |
| 4,877,530 A | 10/1989 | Moses |
| 4,885,912 A | 12/1989 | Nakhamkin |
| 4,886,534 A | 12/1989 | Castan |
| 4,907,495 A | 3/1990 | Sugahara |
| 4,936,109 A | 6/1990 | Longardner |
| 4,942,736 A | 7/1990 | Bronicki |
| 4,947,977 A | 8/1990 | Brunicki |
| 4,955,195 A | 9/1990 | Jones et al. |
| 4,984,432 A | 1/1991 | Corey |
| 5,016,441 A | 5/1991 | Pinto |
| 5,056,601 A | 10/1991 | Grimmer |
| 5,058,385 A | 10/1991 | Everett, Jr. |
| 5,062,498 A | 11/1991 | Tobias |
| 5,107,681 A | 4/1992 | Wolfbauer, III |
| 5,133,190 A | 7/1992 | Abdelmalek |
| 5,138,838 A | 8/1992 | Crosser |
| 5,140,170 A | 8/1992 | Henderson |
| 5,152,260 A | 10/1992 | Erickson et al. |
| 5,161,449 A | 11/1992 | Everett, Jr. |
| 5,169,295 A | 12/1992 | Stogner et al. |
| 5,182,086 A | 1/1993 | Henderson et al. |
| 5,203,168 A | 4/1993 | Oshina |
| 5,209,063 A | 5/1993 | Shirai et al. |
| 5,213,470 A | 5/1993 | Lundquist |
| 5,239,833 A | 8/1993 | Fineblum |
| 5,259,345 A | 11/1993 | Richeson |
| 5,271,225 A | 12/1993 | Adamides |
| 5,279,206 A | 1/1994 | Krantz |
| 5,296,799 A | 3/1994 | Davis |
| 5,309,713 A | 5/1994 | Vassallo |
| 5,321,946 A | 6/1994 | Abdelmalek |
| 5,327,987 A | 7/1994 | Abdelmalek |
| 5,339,633 A | 8/1994 | Fujii et al. |
| 5,341,644 A | 8/1994 | Nelson |
| 5,344,627 A | 9/1994 | Fujii et al. |
| 5,364,611 A | 11/1994 | Iijima et al. |
| 5,365,980 A | 11/1994 | Deberardinis |
| 5,375,417 A | 12/1994 | Barth |
| 5,379,589 A | 1/1995 | Cohn et al. |
| 5,384,489 A | 1/1995 | Bellac |
| 5,387,089 A | 2/1995 | Stogner et al. |
| 5,394,693 A | 3/1995 | Plyter |
| 5,427,194 A | 6/1995 | Miller |
| 5,436,508 A | 7/1995 | Sorensen |
| 5,439,829 A | 8/1995 | Anderson et al. |
| 5,448,889 A | 9/1995 | Bronicki |
| 5,454,408 A | 10/1995 | Dibella et al. |
| 5,454,426 A | 10/1995 | Moseley |
| 5,467,722 A | 11/1995 | Meratla |
| 5,473,899 A | 12/1995 | Viteri et al. |
| 5,477,677 A | 12/1995 | Krnavek |
| 5,491,969 A | 2/1996 | Cohn et al. |
| 5,491,977 A | 2/1996 | Cho |
| 5,524,821 A | 6/1996 | Yie et al. |
| 5,537,822 A | 7/1996 | Shnaid et al. |
| 5,544,698 A | 8/1996 | Paulman |
| 5,557,934 A | 9/1996 | Beach |
| 5,561,978 A | 10/1996 | Buschur |
| 5,562,010 A | 10/1996 | McGuire |
| 5,579,640 A | 12/1996 | Gray, Jr. et al. |
| 5,584,664 A | 12/1996 | Elliott et al. |
| 5,592,028 A | 1/1997 | Pritchard |
| 5,595,587 A | 1/1997 | Steed |
| 5,598,736 A | 2/1997 | Erskine |
| 5,599,172 A | 2/1997 | Mccabe |
| 5,600,953 A | 2/1997 | Oshita et al. |
| 5,616,007 A | 4/1997 | Cohen |
| 5,634,340 A | 6/1997 | Grennan |
| 5,638,684 A * | 6/1997 | Siegel et al. .................. 62/6 |
| 5,641,273 A | 6/1997 | Moseley |
| 5,674,053 A | 10/1997 | Paul et al. |
| 5,685,154 A | 11/1997 | Bronicki et al. |
| 5,685,155 A | 11/1997 | Brown |
| 5,768,893 A | 6/1998 | Hoshino et al. |
| 5,769,610 A | 6/1998 | Paul et al. |
| 5,771,693 A | 6/1998 | Coney |
| 5,775,107 A | 7/1998 | Sparkman |
| 5,778,669 A | 7/1998 | Kubik |
| 5,778,675 A | 7/1998 | Nakhamkin |
| 5,794,442 A | 8/1998 | Lisniansky |
| 5,797,980 A | 8/1998 | Fillet |
| 5,819,533 A | 10/1998 | Moonen |
| 5,819,635 A | 10/1998 | Moonen |
| 5,831,757 A | 11/1998 | DiFrancesco |
| 5,832,728 A | 11/1998 | Buck |
| 5,832,906 A | 11/1998 | Douville et al. |
| 5,839,270 A | 11/1998 | Jirnov et al. |
| 5,845,479 A | 12/1998 | Nakhamkin |
| 5,863,186 A | 1/1999 | Green et al. |
| 5,873,250 A | 2/1999 | Lewis |
| 5,901,809 A | 5/1999 | Berkun |
| 5,924,283 A | 7/1999 | Burke, Jr. |
| 5,934,063 A | 8/1999 | Nakhamkin |
| 5,934,076 A | 8/1999 | Coney |
| 5,937,652 A | 8/1999 | Abdelmalek |
| 5,971,027 A | 10/1999 | Beachley et al. |
| 6,012,279 A | 1/2000 | Hines |
| 6,023,105 A | 2/2000 | Youssef |
| 6,026,349 A | 2/2000 | Heneman |
| 6,029,445 A | 2/2000 | Lech |
| 6,073,445 A | 6/2000 | Johnson |
| 6,073,448 A | 6/2000 | Lozada |
| 6,085,520 A | 7/2000 | Kohno |
| 6,090,186 A | 7/2000 | Spencer |
| 6,119,802 A | 9/2000 | Puett, Jr. |
| 6,132,181 A | 10/2000 | Mccabe |
| 6,145,311 A | 11/2000 | Cyphelly |
| 6,148,602 A | 11/2000 | Demetri |
| 6,153,943 A | 11/2000 | Mistr, Jr. |

(56) References Cited

U.S. PATENT DOCUMENTS

| | | | |
|---|---|---|---|
| 6,158,499 A | 12/2000 | Rhodes |
| 6,170,443 B1 | 1/2001 | Hofbauer |
| 6,178,735 B1 | 1/2001 | Frutschi |
| 6,179,446 B1 | 1/2001 | Sarmadi |
| 6,188,182 B1 | 2/2001 | Nickols et al. |
| 6,202,707 B1 | 3/2001 | Woodall et al. |
| 6,206,660 B1 | 3/2001 | Coney et al. |
| 6,210,131 B1 | 4/2001 | Whitehead |
| 6,216,462 B1 | 4/2001 | Gray, Jr. |
| 6,225,706 B1 | 5/2001 | Keller |
| 6,276,123 B1 | 8/2001 | Chen et al. |
| 6,327,858 B1 | 12/2001 | Negre et al. |
| 6,327,994 B1 | 12/2001 | Labrador |
| 6,349,543 B1 | 2/2002 | Lisniansky |
| RE37,603 E | 3/2002 | Coney |
| 6,352,576 B1 | 3/2002 | Spencer et al. |
| 6,360,535 B1 | 3/2002 | Fisher |
| 6,367,570 B1 | 4/2002 | Long, III |
| 6,372,023 B1 | 4/2002 | Kiyono et al. |
| 6,389,814 B2 | 5/2002 | Viteri et al. |
| 6,397,578 B2 | 6/2002 | Tsukamoto |
| 6,401,458 B2 | 6/2002 | Jacobson |
| 6,407,465 B1 | 6/2002 | Peltz et al. |
| 6,419,462 B1 | 7/2002 | Horie et al. |
| 6,422,016 B2 | 7/2002 | Alkhamis |
| 6,453,659 B1 | 9/2002 | Van Liere et al. |
| 6,478,289 B1 | 11/2002 | Trewin |
| 6,484,498 B1 | 11/2002 | Bonar, II |
| 6,512,966 B2 | 1/2003 | Lof |
| 6,513,326 B1 | 2/2003 | Maceda et al. |
| 6,516,615 B1 | 2/2003 | Stockhausen et al. |
| 6,516,616 B2 | 2/2003 | Carver |
| 6,554,088 B2 | 4/2003 | Severinsky et al. |
| 6,598,392 B2 | 7/2003 | Majeres |
| 6,598,402 B2 | 7/2003 | Kataoka et al. |
| 6,606,860 B2 | 8/2003 | McFarland |
| 6,612,348 B1 | 9/2003 | Wiley |
| 6,619,930 B2 | 9/2003 | Jansen et al. |
| 6,626,212 B2 | 9/2003 | Morioka et al. |
| 6,629,413 B1 | 10/2003 | Wendt et al. |
| 6,637,185 B2 | 10/2003 | Hatamiya et al. |
| 6,652,241 B1 | 11/2003 | Alder |
| 6,652,243 B2 | 11/2003 | Krasnov |
| 6,666,024 B1 | 12/2003 | Moskal |
| 6,670,402 B1 | 12/2003 | Lee et al. |
| 6,672,056 B2 | 1/2004 | Roth et al. |
| 6,675,765 B2 | 1/2004 | Endoh |
| 6,688,108 B1 | 2/2004 | Van Liere |
| 6,698,472 B2 | 3/2004 | Camacho et al. |
| 6,711,984 B2 | 3/2004 | Tagge et al. |
| 6,712,166 B2 | 3/2004 | Rush et al. |
| 6,715,514 B2 | 4/2004 | Parker, III |
| 6,718,761 B2 | 4/2004 | Merswolke et al. |
| 6,739,131 B1 | 5/2004 | Kershaw |
| 6,739,419 B2 | 5/2004 | Jain et al. |
| 6,745,569 B2 | 6/2004 | Gerdes |
| 6,745,801 B1 | 6/2004 | Cohen et al. |
| 6,748,737 B2 | 6/2004 | Lafferty |
| 6,762,926 B1 | 7/2004 | Shiue et al. |
| 6,786,245 B1 | 9/2004 | Eichelberger |
| 6,789,387 B2 | 9/2004 | Brinkman |
| 6,789,576 B2 | 9/2004 | Umetsu et al. |
| 6,797,039 B2 | 9/2004 | Spencer |
| 6,815,840 B1 | 11/2004 | Aldendeshe |
| 6,817,185 B2 | 11/2004 | Coney et al. |
| 6,834,737 B2 | 12/2004 | Bloxham |
| 6,840,309 B2 | 1/2005 | Wilson et al. |
| 6,848,259 B2 | 2/2005 | Keller-sornig |
| 6,857,450 B2 | 2/2005 | Rupp |
| 6,874,453 B2 | 4/2005 | Coney et al. |
| 6,883,775 B2 | 4/2005 | Coney et al. |
| 6,886,326 B2 | 5/2005 | Holtzapple et al. |
| 6,892,802 B2 | 5/2005 | Kelly et al. |
| 6,900,556 B2 | 5/2005 | Provanzana |
| 6,922,991 B2 | 8/2005 | Polcuch |
| 6,925,821 B2 | 8/2005 | Sienel |
| 6,927,503 B2 | 8/2005 | Enis et al. |
| 6,931,848 B2 | 8/2005 | Maceda et al. |
| 6,935,096 B2 | 8/2005 | Haiun |
| 6,938,415 B2 | 9/2005 | Last |
| 6,938,654 B2 | 9/2005 | Gershtein et al. |
| 6,946,017 B2 | 9/2005 | Leppin et al. |
| 6,948,328 B2 | 9/2005 | Kidwell |
| 6,952,058 B2 | 10/2005 | Mccoin |
| 6,959,546 B2 | 11/2005 | Corcoran |
| 6,963,802 B2 | 11/2005 | Enis |
| 6,964,165 B2 | 11/2005 | Uhl et al. |
| 6,964,176 B2 | 11/2005 | Kidwell |
| 6,974,307 B2 | 12/2005 | Antoune et al. |
| 7,000,389 B2 | 2/2006 | Lewellin |
| 7,007,474 B1 | 3/2006 | Ochs et al. |
| 7,017,690 B2 | 3/2006 | Burke |
| 7,028,934 B2 | 4/2006 | Burynski, Jr. |
| 7,040,083 B2 | 5/2006 | Horii et al. |
| 7,040,108 B1 | 5/2006 | Flammang |
| 7,040,859 B2 | 5/2006 | Kane |
| 7,043,920 B2 | 5/2006 | Viteri et al. |
| 7,047,744 B1 | 5/2006 | Robertson et al. |
| 7,055,325 B2 | 6/2006 | Wolken |
| 7,067,937 B2 | 6/2006 | Enish et al. |
| 7,075,189 B2 | 7/2006 | Heronemus |
| RE39,249 E | 8/2006 | Link, Jr. |
| 7,084,520 B2 | 8/2006 | Zambrano |
| 7,086,231 B2 | 8/2006 | Pinkerton |
| 7,093,450 B2 | 8/2006 | Jimenez Haertel et al. |
| 7,093,626 B2 | 8/2006 | Li et al. |
| 7,098,552 B2 | 8/2006 | Mccoin |
| 7,107,766 B2 | 9/2006 | Zacche' et al. |
| 7,107,767 B2 | 9/2006 | Frazer et al. |
| 7,116,006 B2 | 10/2006 | Mccoin |
| 7,124,576 B2 | 10/2006 | Cherney et al. |
| 7,124,586 B2 | 10/2006 | Neqre et al. |
| 7,127,887 B2 | 10/2006 | Nakamura et al. |
| 7,127,895 B2 | 10/2006 | Pinkerton et al. |
| 7,128,777 B2 | 10/2006 | Spencer |
| 7,134,279 B2 | 11/2006 | White |
| 7,155,912 B2 | 1/2007 | Enis et al. |
| 7,168,928 B1 | 1/2007 | West |
| 7,168,929 B2 | 1/2007 | Sieqel et al. |
| 7,169,489 B2 | 1/2007 | Redmond |
| 7,177,751 B2 | 2/2007 | Froloff |
| 7,178,337 B2 | 2/2007 | Pflanz |
| 7,191,603 B2 | 3/2007 | Taube |
| 7,197,871 B2 | 4/2007 | Yoshino |
| 7,201,095 B2 | 4/2007 | Hughey |
| 7,218,009 B2 | 5/2007 | Hendrickson et al. |
| 7,219,779 B2 | 5/2007 | Bauer et al. |
| 7,225,762 B2 | 6/2007 | Mahlanen |
| 7,228,690 B2 | 6/2007 | Barker |
| 7,230,348 B2 | 6/2007 | Poole |
| 7,231,998 B1 | 6/2007 | Schechter |
| 7,240,812 B2 | 7/2007 | Kamikozuru |
| 7,249,617 B2 | 7/2007 | Musselman et al. |
| 7,254,944 B1 | 8/2007 | Goetzinger et al. |
| 7,273,122 B2 | 9/2007 | Rose |
| 7,281,371 B1 | 10/2007 | Heidenreich |
| 7,308,361 B2 | 12/2007 | Enis et al. |
| 7,317,261 B2 | 1/2008 | Rolt |
| 7,322,377 B2 | 1/2008 | Baltes |
| 7,325,401 B1 | 2/2008 | Kesseli et al. |
| 7,328,575 B2 | 2/2008 | Hedman |
| 7,329,099 B2 | 2/2008 | Hartman |
| 7,347,049 B2 | 3/2008 | Rajendran et al. |
| 7,353,786 B2 | 4/2008 | Scuderi et al. |
| 7,353,845 B2 | 4/2008 | Underwood et al. |
| 7,354,252 B2 | 4/2008 | Baatrup et al. |
| 7,364,410 B2 | 4/2008 | Link, Jr. |
| 7,392,871 B2 | 7/2008 | Severinsky et al. |
| 7,406,828 B1 | 8/2008 | Nakhamkin |
| 7,407,501 B2 | 8/2008 | Zvuloni |
| 7,415,835 B2 | 8/2008 | Cowans et al. |
| 7,415,995 B2 | 8/2008 | Plummer et al. |
| 7,417,331 B2 | 8/2008 | De La Torre et al. |
| 7,418,820 B2 | 9/2008 | Harvey et al. |

(56) References Cited

U.S. PATENT DOCUMENTS

| | | |
|---|---|---|
| 7,436,086 B2 | 10/2008 | McClintic |
| 7,441,399 B2 | 10/2008 | Utamura |
| 7,448,213 B2 | 11/2008 | Mitani |
| 7,453,164 B2 | 11/2008 | Borden et al. |
| 7,469,527 B2 | 12/2008 | Neqre et al. |
| 7,471,010 B1 | 12/2008 | Fingersh |
| 7,481,337 B2 | 1/2009 | Luharuka et al. |
| 7,488,159 B2 | 2/2009 | Bhatt et al. |
| 7,527,482 B2 | 5/2009 | Ursan et al. |
| 7,527,483 B1 | 5/2009 | Glauber |
| 7,579,700 B1 | 8/2009 | Meller |
| 7,603,970 B2 | 10/2009 | Scuderi et al. |
| 7,607,503 B1 | 10/2009 | Schechter |
| 7,693,402 B2 | 4/2010 | Hudson et al. |
| 7,694,514 B2 * | 4/2010 | Smith et al. ............ 60/517 |
| 7,802,426 B2 | 9/2010 | Bollinger |
| 7,827,787 B2 | 11/2010 | Cherney et al. |
| 7,832,207 B2 | 11/2010 | McBride et al. |
| 7,843,076 B2 | 11/2010 | Gogoana et al. |
| 7,874,155 B2 | 1/2011 | McBride et al. |
| 7,900,444 B1 | 3/2011 | McBride et al. |
| 7,958,731 B2 | 6/2011 | McBride et al. |
| 7,963,110 B2 | 6/2011 | McBride et al. |
| 8,037,678 B2 | 10/2011 | McBride et al. |
| 8,046,990 B2 | 11/2011 | Bollinger et al. |
| 8,104,274 B2 | 1/2012 | McBride et al. |
| 8,109,085 B2 | 2/2012 | McBride et al. |
| 8,117,842 B2 | 2/2012 | McBride et al. |
| 8,122,718 B2 | 2/2012 | McBride et al. |
| 8,171,728 B2 | 5/2012 | Bollinger et al. |
| 8,191,362 B2 | 6/2012 | McBride et al. |
| 8,225,606 B2 | 7/2012 | McBride et al. |
| 8,234,862 B2 | 8/2012 | McBride et al. |
| 8,234,863 B2 | 8/2012 | McBride et al. |
| 8,234,868 B2 | 8/2012 | Bollinger et al. |
| 8,240,140 B2 | 8/2012 | McBride et al. |
| 8,240,146 B1 | 8/2012 | Bollinger |
| 8,245,508 B2 | 8/2012 | Bollinger et al. |
| 8,250,863 B2 | 8/2012 | Bollinger et al. |
| 8,272,212 B2 | 9/2012 | Blieske |
| 8,359,856 B2 | 1/2013 | Mcbride et al. |
| 8,448,433 B2 | 5/2013 | McBride et al. |
| 8,468,815 B2 | 6/2013 | McBride et al. |
| 8,474,255 B2 | 7/2013 | McBride et al. |
| 8,479,502 B2 | 7/2013 | McBride et al. |
| 8,479,505 B2 | 7/2013 | McBride et al. |
| 8,495,872 B2 | 7/2013 | McBride et al. |
| 8,539,763 B2 | 9/2013 | McBride et al. |
| 8,578,708 B2 | 11/2013 | Bollinger et al. |
| 8,590,296 B2 | 11/2013 | McBride et al. |
| 2001/0045093 A1 | 11/2001 | Jacobson |
| 2003/0131599 A1 | 7/2003 | Gerdes |
| 2003/0145589 A1 | 8/2003 | Tillyer |
| 2003/0177767 A1 | 9/2003 | Keller-sornig et al. |
| 2003/0180155 A1 | 9/2003 | Coney et al. |
| 2004/0050042 A1 | 3/2004 | Frazer |
| 2004/0050049 A1 | 3/2004 | Wendt et al. |
| 2004/0146406 A1 | 7/2004 | Last |
| 2004/0146408 A1 | 7/2004 | Anderson |
| 2004/0148934 A1 | 8/2004 | Pinkerton et al. |
| 2004/0211182 A1 | 10/2004 | Gould |
| 2004/0244580 A1 | 12/2004 | Coney et al. |
| 2004/0261415 A1 | 12/2004 | Negre et al. |
| 2005/0016165 A1 | 1/2005 | Enis et al. |
| 2005/0028529 A1 | 2/2005 | Bartlett et al. |
| 2005/0047930 A1 | 3/2005 | Schmid |
| 2005/0066655 A1 | 3/2005 | Aarestad et al. |
| 2005/0072154 A1 | 4/2005 | Frutschi |
| 2005/0115234 A1 | 6/2005 | Asano et al. |
| 2005/0155347 A1 | 7/2005 | Lewellin |
| 2005/0166592 A1 | 8/2005 | Larson et al. |
| 2005/0274334 A1 | 12/2005 | Warren |
| 2005/0275225 A1 | 12/2005 | Bertolotti |
| 2005/0279086 A1 | 12/2005 | Hoos |
| 2005/0279292 A1 | 12/2005 | Hudson et al. |
| 2005/0279296 A1 | 12/2005 | Coney et al. |
| 2006/0055175 A1 | 3/2006 | Grinblat |
| 2006/0059912 A1 | 3/2006 | Romanelli et al. |
| 2006/0059936 A1 | 3/2006 | Radke et al. |
| 2006/0059937 A1 | 3/2006 | Perkins et al. |
| 2006/0075749 A1 | 4/2006 | Cherney et al. |
| 2006/0090467 A1 | 5/2006 | Crow |
| 2006/0090477 A1 | 5/2006 | Rolff |
| 2006/0107664 A1 | 5/2006 | Hudson et al. |
| 2006/0162543 A1 | 7/2006 | Abe et al. |
| 2006/0162910 A1 | 7/2006 | Kelly et al. |
| 2006/0175337 A1 | 8/2006 | Defosset |
| 2006/0201148 A1 | 9/2006 | Zabtcioqlu |
| 2006/0218924 A1 | 10/2006 | Mitani |
| 2006/0242954 A1 | 11/2006 | Welch |
| 2006/0248886 A1 | 11/2006 | Ma |
| 2006/0248892 A1 | 11/2006 | Ingersoll |
| 2006/0254281 A1 | 11/2006 | Badeer et al. |
| 2006/0260311 A1 | 11/2006 | Ingersoll |
| 2006/0260312 A1 | 11/2006 | Ingersoll |
| 2006/0262465 A1 | 11/2006 | Wiederhold |
| 2006/0266034 A1 | 11/2006 | Ingersoll |
| 2006/0266035 A1 | 11/2006 | Ingersoll et al. |
| 2006/0266036 A1 | 11/2006 | Ingersoll |
| 2006/0266037 A1 | 11/2006 | Ingersoll |
| 2006/0280993 A1 | 12/2006 | Keefer et al. |
| 2006/0283967 A1 | 12/2006 | Cho et al. |
| 2007/0006586 A1 | 1/2007 | Hoffman et al. |
| 2007/0022754 A1 | 2/2007 | Perkins et al. |
| 2007/0022755 A1 | 2/2007 | Pinkerton et al. |
| 2007/0062194 A1 | 3/2007 | Ingersoll |
| 2007/0074533 A1 | 4/2007 | Hugenroth et al. |
| 2007/0095069 A1 | 5/2007 | Joshi et al. |
| 2007/0113803 A1 | 5/2007 | Froloff et al. |
| 2007/0116572 A1 | 5/2007 | Barbu et al. |
| 2007/0137595 A1 | 6/2007 | Greenwell |
| 2007/0151528 A1 | 7/2007 | Hedman |
| 2007/0158946 A1 | 7/2007 | Annen et al. |
| 2007/0181199 A1 | 8/2007 | Weber |
| 2007/0182160 A1 | 8/2007 | Enis et al. |
| 2007/0205298 A1 | 9/2007 | Harrison et al. |
| 2007/0234749 A1 | 10/2007 | Enis et al. |
| 2007/0243066 A1 | 10/2007 | Baron |
| 2007/0245735 A1 | 10/2007 | Ashikian |
| 2007/0258834 A1 | 11/2007 | Froloff et al. |
| 2008/0000436 A1 | 1/2008 | Goldman |
| 2008/0016868 A1 | 1/2008 | Ochs et al. |
| 2008/0047272 A1 | 2/2008 | Schoell |
| 2008/0050234 A1 | 2/2008 | Ingersoll et al. |
| 2008/0072870 A1 | 3/2008 | Chomyszak et al. |
| 2008/0087165 A1 | 4/2008 | Wright et al. |
| 2008/0104939 A1 | 5/2008 | Hoffmann et al. |
| 2008/0112807 A1 | 5/2008 | Uphues et al. |
| 2008/0127632 A1 | 6/2008 | Finkenrath et al. |
| 2008/0138265 A1 | 6/2008 | Lackner et al. |
| 2008/0148731 A1 | 6/2008 | Cao |
| 2008/0155975 A1 | 7/2008 | Brinkman |
| 2008/0155976 A1 | 7/2008 | Smith et al. |
| 2008/0157528 A1 | 7/2008 | Wang et al. |
| 2008/0157537 A1 | 7/2008 | Richard |
| 2008/0164449 A1 | 7/2008 | Gray et al. |
| 2008/0185194 A1 | 8/2008 | Leone |
| 2008/0202120 A1 | 8/2008 | Karyambas |
| 2008/0211230 A1 | 9/2008 | Gurin |
| 2008/0228323 A1 | 9/2008 | Laumer et al. |
| 2008/0233029 A1 | 9/2008 | Fan et al. |
| 2008/0238105 A1 | 10/2008 | Ortiz et al. |
| 2008/0238187 A1 | 10/2008 | Garnett et al. |
| 2008/0250788 A1 | 10/2008 | Nuel et al. |
| 2008/0251302 A1 | 10/2008 | Lynn et al. |
| 2008/0265581 A1 | 10/2008 | Welch et al. |
| 2008/0272597 A1 | 11/2008 | Althaus |
| 2008/0272598 A1 | 11/2008 | Nakhamkin |
| 2008/0272605 A1 | 11/2008 | Borden et al. |
| 2008/0308168 A1 | 12/2008 | O'Brien, II et al. |
| 2008/0308270 A1 | 12/2008 | Wilson |
| 2008/0315589 A1 | 12/2008 | Malmrup |
| 2009/0000290 A1 | 1/2009 | Brinkman |
| 2009/0007558 A1 | 1/2009 | Hall |

(56) References Cited

U.S. PATENT DOCUMENTS

| | | |
|---|---|---|
| 2009/0010772 A1 | 1/2009 | Siemroth |
| 2009/0021012 A1 | 1/2009 | Stull et al. |
| 2009/0056331 A1 | 3/2009 | Zhao et al. |
| 2009/0071153 A1 | 3/2009 | Boyapati et al. |
| 2009/0107784 A1 | 4/2009 | Gabriel et al. |
| 2009/0145130 A1 | 6/2009 | Kaufman |
| 2009/0158740 A1 | 6/2009 | Littau et al. |
| 2009/0178409 A1 | 7/2009 | Shinnar |
| 2009/0200805 A1 | 8/2009 | Kim et al. |
| 2009/0220364 A1 | 9/2009 | Rigal et al. |
| 2009/0229902 A1 | 9/2009 | Stansbury, III |
| 2009/0249826 A1 | 10/2009 | Hugelman |
| 2009/0282822 A1 | 11/2009 | McBride et al. |
| 2009/0282840 A1 | 11/2009 | Chen et al. |
| 2009/0294096 A1 | 12/2009 | Mills et al. |
| 2009/0301089 A1 | 12/2009 | Bollinger |
| 2009/0317267 A1 | 12/2009 | Gill et al. |
| 2009/0322090 A1 | 12/2009 | Wolf |
| 2010/0018196 A1 | 1/2010 | Li et al. |
| 2010/0077765 A1 | 4/2010 | Japikse |
| 2010/0089063 A1 | 4/2010 | McBride et al. |
| 2010/0133903 A1 | 6/2010 | Rufer |
| 2010/0139277 A1 | 6/2010 | McBride et al. |
| 2010/0193270 A1 | 8/2010 | Deshaies et al. |
| 2010/0199652 A1 | 8/2010 | Lemofouet |
| 2010/0205960 A1 | 8/2010 | McBride et al. |
| 2010/0229544 A1 | 9/2010 | Bollinger et al. |
| 2010/0257862 A1 | 10/2010 | Howes et al. |
| 2010/0270801 A1 | 10/2010 | Liu |
| 2010/0307156 A1 | 12/2010 | Bollinger |
| 2010/0326062 A1 | 12/2010 | Fong et al. |
| 2010/0326064 A1 | 12/2010 | Fong et al. |
| 2010/0326066 A1 | 12/2010 | Fong et al. |
| 2010/0326068 A1 | 12/2010 | Fong et al. |
| 2010/0326069 A1 | 12/2010 | Fong et al. |
| 2010/0326075 A1 | 12/2010 | Fong et al. |
| 2010/0329891 A1 | 12/2010 | Fong et al. |
| 2010/0329903 A1 | 12/2010 | Fong et al. |
| 2010/0329909 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1 | 3/2011 | McBride et al. |
| 2011/0061741 A1 | 3/2011 | Ingersoll et al. |
| 2011/0061836 A1 | 3/2011 | Ingersoll et al. |
| 2011/0062166 A1 | 3/2011 | Ingersoll et al. |
| 2011/0106321 A1 | 5/2011 | Cherian et al. |
| 2011/0107755 A1 | 5/2011 | McBride et al. |
| 2011/0115223 A1 | 5/2011 | Stahlkopf et al. |
| 2011/0131966 A1 | 6/2011 | McBride et al. |
| 2011/0138797 A1 | 6/2011 | Bollinger et al. |
| 2011/0167813 A1 | 7/2011 | McBride et al. |
| 2011/0204064 A1 | 8/2011 | Crane et al. |
| 2011/0219760 A1 | 9/2011 | McBride et al. |
| 2011/0219763 A1 | 9/2011 | McBride et al. |
| 2011/0232281 A1 | 9/2011 | McBride et al. |
| 2011/0233934 A1 | 9/2011 | Crane et al. |
| 2011/0252777 A1 | 10/2011 | Bollinger et al. |
| 2011/0258996 A1 | 10/2011 | Ingersoll et al. |
| 2011/0258999 A1 | 10/2011 | Ingersoll et al. |
| 2011/0259001 A1 | 10/2011 | McBride et al. |
| 2011/0259442 A1 | 10/2011 | McBride et al. |
| 2011/0266810 A1 | 11/2011 | McBride et al. |
| 2011/0283690 A1 | 11/2011 | Bollinger et al. |
| 2011/0296822 A1 | 12/2011 | Bollinger et al. |
| 2011/0296823 A1 | 12/2011 | McBride et al. |
| 2011/0314800 A1 | 12/2011 | Fong et al. |
| 2011/0314804 A1 | 12/2011 | Fong et al. |
| 2011/0314810 A1 | 12/2011 | McBride et al. |
| 2012/0000557 A1 | 1/2012 | McBride et al. |
| 2012/0006013 A1 | 1/2012 | McBride et al. |
| 2012/0017580 A1 | 1/2012 | Fong et al. |
| 2012/0019009 A1 | 1/2012 | Fong et al. |
| 2012/0023919 A1 | 2/2012 | Fong et al. |
| 2012/0036851 A1 | 2/2012 | McBride et al. |
| 2012/0042772 A1 | 2/2012 | Fong et al. |
| 2012/0047884 A1 | 3/2012 | McBride et al. |
| 2012/0055147 A1 | 3/2012 | Fong et al. |
| 2012/0057996 A1 | 3/2012 | Fong et al. |
| 2012/0057998 A1 | 3/2012 | Ingersoll et al. |
| 2012/0067036 A1 | 3/2012 | Fong et al. |
| 2012/0073432 A1 | 3/2012 | Ingersoll et al. |
| 2012/0085086 A1 | 4/2012 | Bollinger et al. |
| 2012/0090314 A1 | 4/2012 | Fong et al. |
| 2012/0096845 A1 | 4/2012 | Ingersoll et al. |
| 2012/0102935 A1 | 5/2012 | Ingersoll et al. |
| 2012/0102954 A1 | 5/2012 | Ingersoll et al. |
| 2012/0118137 A1 | 5/2012 | Fong et al. |
| 2012/0119513 A1 | 5/2012 | McBride et al. |
| 2012/0119514 A1 | 5/2012 | Crane et al. |
| 2012/0137668 A1 | 6/2012 | McBride et al. |
| 2012/0174569 A1 | 7/2012 | Ingersoll et al. |
| 2012/0197683 A1 | 8/2012 | Marcus |
| 2012/0210705 A1 | 8/2012 | Mcbride et al. |
| 2012/0222424 A1 | 9/2012 | Ingersoll et al. |
| 2012/0255292 A1 | 10/2012 | Fong et al. |
| 2012/0260645 A1 | 10/2012 | Fong et al. |
| 2012/0269651 A1 | 10/2012 | Fong et al. |
| 2012/0279209 A1 | 11/2012 | McBride et al. |
| 2012/0285154 A1 | 11/2012 | Bollinger et al. |
| 2012/0286522 A1 | 11/2012 | Stahlkopf et al. |
| 2012/0291989 A1 | 11/2012 | Fong et al. |
| 2012/0297772 A1 | 11/2012 | McBride et al. |
| 2012/0297776 A1 | 11/2012 | Bollinger et al. |
| 2012/0299310 A1 | 11/2012 | McBride et al. |
| 2013/0001958 A1 | 1/2013 | Crane et al. |
| 2013/0009408 A1 | 1/2013 | Crane et al. |
| 2013/0032743 A1 | 2/2013 | Fong et al. |
| 2013/0047597 A1 | 2/2013 | Fong et al. |
| 2013/0074485 A1 | 3/2013 | McBride et al. |
| 2013/0074488 A1 | 3/2013 | McBride et al. |
| 2013/0074940 A1 | 3/2013 | McBride et al. |
| 2013/0074941 A1 | 3/2013 | McBride et al. |
| 2013/0074949 A1 | 3/2013 | McBride et al. |
| 2013/0091834 A1 | 4/2013 | McBride et al. |
| 2013/0091835 A1 | 4/2013 | McBride et al. |
| 2013/0091836 A1 | 4/2013 | McBride et al. |
| 2013/0098027 A1 | 4/2013 | Le Roux et al. |
| 2013/0104533 A1 | 5/2013 | Fong et al. |
| 2013/0108480 A1 | 5/2013 | Fong et al. |
| 2013/0111895 A1 | 5/2013 | Fong et al. |
| 2013/0126014 A1 | 5/2013 | Fong et al. |
| 2013/0139500 A1 | 6/2013 | McBride et al. |
| 2013/0145764 A1 | 6/2013 | McBride et al. |
| 2013/0152568 A1 | 6/2013 | Modderno et al. |
| 2013/0152572 A1 | 6/2013 | Madderno et al. |
| 2013/0168961 A1 | 7/2013 | Stahlkopf et al. |
| 2013/0186597 A1 | 7/2013 | Clark et al. |
| 2013/0192216 A1 | 8/2013 | Berlin, Jr. et al. |
| 2013/0269330 A1 | 10/2013 | McBride et al. |
| 2013/0269331 A1 | 10/2013 | Fong |
| 2013/0276440 A1 | 10/2013 | Fong et al. |
| 2013/0291529 A1 | 11/2013 | Stahlkopf et al. |
| 2013/0291960 A1 | 11/2013 | Fong et al. |
| 2013/0294943 A1 | 11/2013 | Fong et al. |
| 2013/0298760 A1 | 11/2013 | McBride et al. |
| 2013/0305704 A1 | 11/2013 | Ingersoll et al. |
| 2013/0307269 A1 | 11/2013 | Fong et al. |
| 2013/0312417 A1 | 11/2013 | McBride et al. |

FOREIGN PATENT DOCUMENTS

| | | |
|---|---|---|
| CN | 1061262 | 5/1992 |
| CN | 1171490 | 1/1998 |
| CN | 1276308 | 12/2000 |
| CN | 1277323 | 12/2000 |
| CN | 1412443 | 4/2003 |
| CN | 1743665 | 3/2006 |
| CN | 2821162 | 9/2006 |
| CN | 2828319 | 10/2006 |
| CN | 2828368 | 10/2006 |
| CN | 1884822 | 12/2006 |

(56) References Cited

FOREIGN PATENT DOCUMENTS

| | | |
|---|---|---|
| CN | 1888328 | 1/2007 |
| CN | 1967091 | 5/2007 |
| CN | 101033731 | 9/2007 |
| CN | 101042115 | 9/2007 |
| CN | 101070822 | 11/2007 |
| CN | 101149002 | 3/2008 |
| CN | 101162073 | 4/2008 |
| CN | 201103518 | 8/2008 |
| CN | 201106527 | 8/2008 |
| CN | 101289963 | 10/2008 |
| CN | 201125855 | 10/2008 |
| CN | 101377190 | 4/2009 |
| CN | 101408213 | 4/2009 |
| CN | 101435451 | 5/2009 |
| DE | 25 38 870 | 6/1977 |
| DE | 19530253 | 11/1996 |
| DE | 19903907 | 8/2000 |
| DE | 19911534 | 9/2000 |
| DE | 10042020 | 5/2001 |
| DE | 20118183 | 3/2003 |
| DE | 20120330 | 4/2003 |
| DE | 10147940 | 5/2003 |
| DE | 10205733 | 8/2003 |
| DE | 10212480 | 10/2003 |
| DE | 20312293 | 12/2003 |
| DE | 10220499 | 4/2004 |
| DE | 10334637 | 2/2005 |
| DE | 10 2005 047 622 | 4/2007 |
| EP | 0204748 | 3/1981 |
| EP | 0091801 | 10/1983 |
| EP | 0097002 | 12/1983 |
| EP | 0196690 | 10/1986 |
| EP | 0212692 | 3/1987 |
| EP | 0364106 | 4/1990 |
| EP | 0507395 | 10/1992 |
| EP | 0821162 | 1/1998 |
| EP | 0 857 877 | 8/1998 |
| EP | 1 388 442 | 2/2004 |
| EP | 1405662 | 4/2004 |
| EP | 1657452 | 11/2004 |
| EP | 1726350 | 11/2006 |
| EP | 1741899 | 1/2007 |
| EP | 1 780 058 | 5/2007 |
| EP | 1988294 | 11/2008 |
| EP | 2014896 | 1/2009 |
| EP | 2078857 | 7/2009 |
| FR | 2449805 | 9/1980 |
| FR | 2816993 | 5/2002 |
| FR | 2829805 | 3/2003 |
| GB | 722524 | 11/1951 |
| GB | 772703 | 4/1957 |
| GB | 1449076 | 9/1976 |
| GB | 1479940 | 7/1977 |
| GB | 1 589 364 A | 5/1981 |
| GB | 2106992 | 4/1983 |
| GB | 2223810 | 4/1990 |
| GB | 2 300 673 | 11/1996 |
| GB | 2373546 | 9/2002 |
| GB | 2403356 | 12/2004 |
| JP | 57010778 | 1/1982 |
| JP | 57070970 | 5/1982 |
| JP | 57120058 | 7/1982 |
| JP | 58183880 | 10/1982 |
| JP | 58150079 | 9/1983 |
| JP | 58192976 | 11/1983 |
| JP | 60206985 | 10/1985 |
| JP | 62101900 | 5/1987 |
| JP | 63227973 | 9/1988 |
| JP | 2075674 | 3/1990 |
| JP | 2247469 | 10/1990 |
| JP | 3009090 | 1/1991 |
| JP | 3281984 | 12/1991 |
| JP | 4121424 | 4/1992 |
| JP | 6185450 | 7/1994 |
| JP | 8145488 | 6/1996 |
| JP | 9166079 | 6/1997 |
| JP | 10313547 | 11/1998 |
| JP | 2000-346093 | 6/1999 |
| JP | 11351125 | 12/1999 |
| JP | 2000166128 | 6/2000 |
| JP | 2000346093 | 12/2000 |
| JP | 2002127902 | 5/2002 |
| JP | 2003083230 | 3/2003 |
| JP | 2005023918 | 1/2005 |
| JP | 2005036769 | 2/2005 |
| JP | 2005068963 | 3/2005 |
| JP | 2006220252 | 8/2006 |
| JP | 2007001872 | 1/2007 |
| JP | 2007145251 | 6/2007 |
| JP | 2007211730 | 8/2007 |
| JP | 2008038658 | 2/2008 |
| KR | 840000180 | 2/1984 |
| KR | 2004004637 | 1/2004 |
| RU | 2101562 | 1/1998 |
| RU | 2169857 | 6/2001 |
| RU | 2213255 | 9/2003 |
| SU | 800438 | 1/1981 |
| UA | 69030 | 8/2004 |
| WO | WO-82/00319 | 2/1982 |
| WO | WO-8802818 | 4/1988 |
| WO | WO-99/41498 | 8/1990 |
| WO | WO-92/022741 | 12/1992 |
| WO | WO-93/06367 | 4/1993 |
| WO | WO-93/11363 | 6/1993 |
| WO | WO-93/24754 | 12/1993 |
| WO | WO 9412785 | 6/1994 |
| WO | WO-95/25381 | 9/1995 |
| WO | WO-96/01942 | 1/1996 |
| WO | WO-96/22456 | 7/1996 |
| WO | WO-96/34213 | 10/1996 |
| WO | WO-97/01029 | 1/1997 |
| WO | WO-97/17546 | 5/1997 |
| WO | WO-98/02818 | 1/1998 |
| WO | WO-98/17492 | 4/1998 |
| WO | WO-00/01945 | 1/2000 |
| WO | WO-00/37800 | 6/2000 |
| WO | WO-00/65212 | 11/2000 |
| WO | WO-00/68578 | 11/2000 |
| WO | WO-01/75308 | 10/2001 |
| WO | WO 0175290 | 10/2001 |
| WO | WO-02/25083 | 3/2002 |
| WO | WO-02/46621 | 6/2002 |
| WO | WO-02/103200 | 12/2002 |
| WO | WO-03/021107 | 3/2003 |
| WO | WO-03021702 | 3/2003 |
| WO | WO-03/078812 | 9/2003 |
| WO | WO-03081011 | 10/2003 |
| WO | WO-2004/037391 | 5/2004 |
| WO | WO-2004/059155 | 7/2004 |
| WO | WO-2004/072452 | 8/2004 |
| WO | WO-2004/074679 | 9/2004 |
| WO | WO-2004/109172 | 12/2004 |
| WO | WO-2005/044424 | 5/2005 |
| WO | WO-2005/062969 | 7/2005 |
| WO | WO-2005/067373 | 7/2005 |
| WO | WO-2005/079461 | 9/2005 |
| WO | WO-2005/088131 | 9/2005 |
| WO | WO-2005/095155 | 10/2005 |
| WO | WO-2006/029633 | 3/2006 |
| WO | WO-2006/058085 | 6/2006 |
| WO | WO-2006/124006 | 11/2006 |
| WO | WO-2007/002094 | 1/2007 |
| WO | WO-2007/003954 | 1/2007 |
| WO | WO-2007/012143 | 2/2007 |
| WO | WO-2007/035997 | 4/2007 |
| WO | WO-2007/051034 | 5/2007 |
| WO | WO-2007/066117 | 6/2007 |
| WO | WO-2007/086792 | 8/2007 |
| WO | WO-2007/089872 | 8/2007 |
| WO | WO-2007/096656 | 8/2007 |
| WO | WO-2007/111839 | 10/2007 |
| WO | WO-2007/136765 | 11/2007 |
| WO | WO-2007/140914 | 12/2007 |
| WO | WO-2008/003950 | 1/2008 |

(56) References Cited

FOREIGN PATENT DOCUMENTS

| WO | WO-2008/014769 | 2/2008 |
|----|----------------|--------|
| WO | WO-2008023901  | 2/2008 |
| WO | WO-2008/027259 | 3/2008 |
| WO | WO-2008/028881 | 3/2008 |
| WO | WO-2008/039725 | 4/2008 |
| WO | WO-2008/045468 | 4/2008 |
| WO | WO-2009045468  | 4/2008 |
| WO | WO-2008/051427 | 5/2008 |
| WO | WO-2008/074075 | 6/2008 |
| WO | WO-2008/084507 | 7/2008 |
| WO | WO-2008/091373 | 7/2008 |
| WO | WO 2008102292  | 8/2008 |
| WO | WO-2008/106967 | 9/2008 |
| WO | WO-2008/108870 | 9/2008 |
| WO | WO-2008/109006 | 9/2008 |
| WO | WO-2008/110018 | 9/2008 |
| WO | WO-2008/115479 | 9/2008 |
| WO | WO-2008/121378 | 10/2008 |
| WO | WO-2008139267  | 11/2008 |
| WO | WO-2008/152432 | 12/2008 |
| WO | WO-2008/153591 | 12/2008 |
| WO | WO-2008/157327 | 12/2008 |
| WO | WO-2009/034548 | 3/2009 |
| WO | WO-2009/038973 | 3/2009 |
| WO | WO-2009034421  | 3/2009 |
| WO | WO-2009/045110 | 4/2009 |
| WO | WO-2009044139  | 4/2009 |
| WO | WO-2009/114205 | 9/2009 |
| WO | WO-2009/126784 | 10/2009 |
| WO | WO-2010/006319 | 1/2010 |
| WO | WO-2010/009053 | 1/2010 |
| WO | WO-2010/040890 | 4/2010 |
| WO | WO-2010/105155 | 9/2010 |
| WO | WO-2010/135658 | 11/2010 |
| WO | WO-2011/008321 | 1/2011 |
| WO | WO-2011/008325 | 1/2011 |
| WO | WO-2011/008500 | 1/2011 |
| WO | WO-2011/079267 | 6/2011 |
| WO | WO-2011/079271 | 6/2011 |

OTHER PUBLICATIONS

Lemofouet, "Investigation and Optimisation of Hybrid Electricity Storage Systems Based on Compressed Air and Supercapacitors," (Oct. 20, 2006), 250 pages.

Cyphelly et al., "Usage of Compressed Air Storage Systems," BFE-Program "Electricity," Final Report, May 2004, 14 pages.

Lemofouet et al., "A Hybrid Energy Storage System Based on Compressed Air and Supercapacitors with Maximum Efficiency Point Tracking (MEPT)," IEEE Transactions on Industrial Electron, vol. 53, No. 4, (Aug. 2006) pp. 1105-1115.

International Search Report and Written Opinion issued Sep. 15, 2009 for International Application No. PCT/US2009/040027, 8 pages.

International Search Report and Written Opinion issued Aug. 30, 2010 for International Application No. PCT/US2010/029795, 9 pages.

International Search Report and Written Opinion issued Dec. 3, 2009 for International Application No. PCT/US2009/046725, 9 pages.

International Search Report and Written Opinion issued Jan. 4, 2011 for International Application No. PCT/US2010/055279, 13 pages.

International Search Report and Written Opinion mailed May 25, 2011 for International Application No. PCT/US2010/027138, 12 pages.

Rufer et al., "Energetic Performance of a Hybrid Energy Storage System Based on Compressed Air and Super Capacitors," Power Electronics, Electrical Drives, Automation and Motion, (May 1, 2006), pp. 469-474.

Lemofouet et al. "Hybrid Energy Storage Systems based on Compressed Air and Supercapacitors with Maximum Efficiency Point Tracking," Industrial Electronics Laboratory (LEI), (2005), pp. 1-10.

Lemofouet et al. "Hybrid Energy Storage Systems based on Compressed Air and Supercapacitors with Maximum Efficiency Point Tracking," The International Power Electronics Conference, (2005), pp. 461-468.

International Preliminary Report on Patentability mailed Oct. 13, 2011 for International Application No. PCT/US2010/029795 (9 pages).

Stephenson et al., "Computer Modelling of Isothermal Compression in the Reciprocating Compressor of a Complete Isoengine," 9th International Conference on Liquid Atomization and Spray Systems (Jul. 13-17, 2003).

Coney et al., "Development of a Reciprocating Compressor Using Water Injection to Achieve Quasi-Isothermal Compression," Purdue University International Compressor Engineering Conference (2002).

Linnemann et al., "The Isoengine—A Novel High Efficiency Engine with Optional Compressed Air Energy Storage (CAES)," International Joint Power Generation Conference (Jun. 16-19, 2003).

Linnemann et al., "The Isoengine: Realisation of a High-Efficiency Power Cycle Based on Isothermal Compression," Int. J. Energy Tech. and Policy, vol. 3, Nos. 1-2, pp. 66-84 (2005).

Winterburn et al., "Mechanisms of Ultrasound Foam Interactions," Asia-Pac. J. Chem. Eng., vol. 4, pp. 184-190 (2009).

\* cited by examiner

SYSTEMS AND METHODS FOR EFFICIENT PUMPING OF HIGH-PRESSURE FLUIDS FOR ENERGY

RELATED APPLICATIONS

This application is a continuation of U.S. patent application Ser. No. 13/009,409, filed on Jan. 19, 2011, which (A) claims the benefit of and priority to U.S. Provisional Patent Application No. 61/328,345, filed Apr. 27, 2010, and (B) is a continuation-in-part of U.S. patent application Ser. No. 12/639,703, filed Dec. 16, 2009, which (i) is a continuation-in-part of U.S. patent application Ser. No. 12/421,057, filed Apr. 9, 2009, which claims the benefit of and priority to U.S. Provisional Patent Application No. 61/148,691, filed Jan. 30, 2009, and U.S. Provisional Patent Application No. 61/043,630, filed Apr. 9, 2008; (ii) is a continuation-in-part of U.S. patent application Ser. No. 12/481,235, filed Jun. 9, 2009, which claims the benefit of and priority to U.S. Provisional Patent Application No. 61/059,964, filed Jun. 9, 2008; and (iii) claims the benefit of and priority to U.S. Provisional Patent Application Nos. 61/166,448, filed on Apr. 3, 2009; 61/184,166, filed on Jun. 4, 2009; 61/223,564, filed on Jul. 7, 2009; 61/227,222, filed on Jul. 21, 2009; and 61/251,965, filed on Oct. 15, 2009. The entire disclosure of each of these applications is hereby incorporated herein by reference.

STATEMENT REGARDING FEDERALLY SPONSORED RESEARCH

This invention was made with government support under IIP-0810590 and IIP-0923633 awarded by the NSF. The government has certain rights in the invention.

FIELD OF THE INVENTION

In various embodiments, the present invention relates to pneumatics, power generation, and energy storage, and more particularly, to compressed-gas energy-storage systems and methods using pneumatic cylinders.

BACKGROUND

Storing energy in the form of compressed gas has a long history and components tend to be well tested, reliable, and have long lifetimes. The general principle of compressed-gas or compressed-air energy storage (CAES) is that generated energy (e.g., electric energy) is used to compress gas (e.g., air), thus converting the original energy to pressure potential energy; this potential energy is later recovered in a useful form (e.g., converted back to electricity) via gas expansion coupled to an appropriate mechanism. Advantages of compressed-gas energy storage include low specific-energy costs, long lifetime, low maintenance, reasonable energy density, and good reliability.

If a body of gas is at the same temperature as its environment, and expansion occurs slowly relative to the rate of heat exchange between the gas and its environment, then the gas will remain at approximately constant temperature as it expands. This process is termed "isothermal" expansion. Isothermal expansion of a quantity of gas stored at a given temperature recovers approximately three times more work than would "adiabatic expansion," that is, expansion where no heat is exchanged between the gas and its environment, because the expansion happens rapidly or in an insulated chamber. Gas may also be compressed isothermally or adiabatically.

An ideally isothermal energy-storage cycle of compression, storage, and expansion would have 100% thermodynamic efficiency. An ideally adiabatic energy-storage cycle would also have 100% thermodynamic efficiency, but there are many practical disadvantages to the adiabatic approach. These include the production of higher temperature and pressure extremes within the system, heat loss during the storage period, and inability to exploit environmental (e.g., cogenerative) heat sources and sinks during compression and expansion, respectively. In an isothermal system, the cost of adding a heat-exchange system is traded against resolving the difficulties of the adiabatic approach. In either case, mechanical energy from expanding gas must usually be converted to electrical energy before use.

An efficient and novel design for storing energy in the form of compressed gas utilizing near isothermal gas compression and expansion has been shown and described in U.S. Pat. No. 7,832,207 (the '207 patent) and U.S. patent application Ser. No. 12/639,703 (the '703 application), the disclosures of which are hereby incorporated herein by reference in their entireties. The '207 patent and '703 application disclose systems and methods for expanding gas isothermally in staged hydraulic/pneumatic cylinders and intensifiers over a large pressure range in order to generate electrical energy when required. Mechanical energy from the expanding gas is used to drive a hydraulic pump/motor subsystem that produces electricity. Systems and methods for hydraulic-pneumatic pressure intensification that may be employed in systems and methods such as those disclosed in the '207 patent and '703 application are shown and described in U.S. patent application Ser. No. 12/879,595 (the '595 application), the disclosure of which is hereby incorporated herein by reference in its entirety.

In the systems disclosed in the '207 patent and '703 application, reciprocal mechanical motion is produced during recovery of energy from storage by expansion of gas in the cylinders. This reciprocal motion may be converted to electricity by a variety of means, for example as disclosed in the '595 application, as well as in U.S. patent application Ser. No. 12/938,853 (the '853 application), the disclosure of which is hereby incorporated herein by reference in its entirety. Additionally, as described in the '703 application, heat-exchange liquid may be sprayed into a cylinder chamber containing gas undergoing expansion or compression. Such a heat-exchange spray may enable isothermal expansion or compression of gas, with resulting efficiency gains.

The ability of such systems to either store energy (i.e., use energy to compress gas into a storage reservoir) or produce energy (i.e., expand gas from a storage reservoir to release energy) will be apparent to any person reasonably familiar with the principles of electrical and pneumatic machines. However, energy storage systems like those described above may utilize pumps to circulate heat-exchange fluid that either do not accept high-pressure input flows or else do not pump high-pressure inputs with high efficiency, thus diminishing the overall efficiency of the entire system. Specifically, some amount of the work required to pressurize heat-exchange fluid from a low ambient pressure is wasted. Thus, it would be desirable to extract already-pressurized heat-exchange fluid from the system itself, circulate it at its elevated pressure, thermally condition it (if necessary), and recycle it back into the system.

SUMMARY

Embodiments of the present invention provide for the energy-efficient pumping of liquid for the production of liquid sprays used to approximate isothermal expansion and compression inside pneumatic cylinders (and/or pneumatic compartments of various other types of cylinders) or inside other mechanical assemblies for expanding or compressing gas, with resulting gain in the efficiency of the overall energy-storage and energy-recovery process. In the prior art, pumps typically either do not accept high-pressure input flows or else do not pump high-pressure inputs with high efficiency, as mentioned above. Various embodiments of the present invention overcome these disadvantages by enabling the energy-efficient pumping of liquid already at high pressure (e.g., greater than approximately 1,000 pounds per square inch gauge [psig], or even greater than approximately 3,000 psig) to a somewhat higher pressure (e.g., approximately 50 psig higher). Useful applications include, but are not limited to, (1) the provision of a liquid spray into a vessel storing pressurized gas, this spray enabling the transfer of heat to or from the gas, (2) the energy-efficient introduction of liquid sprays into chambers containing pressurized gas, these sprays enabling the approximately isothermal expansion or compression of the gas, and (3) booster pumping in a high-pressure pipeline or between high pressure vessels.

Generally, embodiments of the invention utilize a reciprocating, double-acting, positive-displacement pump having a fluid-filled chamber containing a piston or other mechanism that separates the fluid on one side of the piston from the fluid on the other side, preventing fluid migration from one side to the other while allowing the transfer of force/pressure from one side to the other. The systems described herein may be used to significantly increase the efficiency of, e.g., a variety of compressed-gas energy storage systems. In particular, in a compressed-gas energy storage system, gas is stored at high pressure (e.g., approximately 3,000 psig). This gas may be expanded into a chamber containing a piston or other mechanism that separates the gas on one side of the chamber from the other, preventing gas migration from one chamber to the other while allowing the transfer of force/pressure from one chamber to the next. Such an arrangement of chambers and piston (or other mechanism) is termed a "pneumatic cylinder" or "cylinder" for the purposes of this application. The shaft of the cylinder may be coupled hydraulically or mechanically to a mechanical load (e.g., a hydraulic motor/pump or a crankshaft) that is in turn coupled to an electrical load (e.g., rotary or linear electric motor/generator attached to power electronics and/or directly to the grid or other loads), as described in the '595 and '853 applications.

Gas undergoing expansion tends to cool, while gas undergoing compression tends to heat. Several methods for approximating isothermal expansion and compression may be employed as described, for example, in the '703 application. As disclosed in the '703 application, droplets of a liquid (e.g., water) may be sprayed into the side of a double-acting pneumatic cylinder presently undergoing expansion or compression to expedite heat transfer to or from the gas. As these droplets exchange heat with the gas around them, the temperature of the gas-droplet mixture is either raised or lowered. The liquid is evacuated from the cylinder through a suitable mechanism. The heat-exchange spray droplets may be introduced through spray heads and/or spray rods. If the rate of heat exchange is appropriate, an isothermal process may be approximated.

Embodiments of the invention may be used to efficiently drive a heat-exchange liquid into a pneumatic chamber. In one embodiment, an actuator exerts force on a cylinder's piston to raise the pressure of heat-exchange liquid in one of the cylinder's two chambers. A quantity of work $W_L$ is required to raise the pressure of a given volume of liquid in the chamber from some starting (inlet) pressure $P_s$, to the injection (outlet) pressure $P_i$ (e.g., approximately 3,010 psig, sufficient for spraying into a chamber containing gas at approximately 3,000 psig). To perform this work $W_L$ on the liquid, the motor or actuator driving the piston must perform input work $W_i > W_L$, which is communicated to the liquid with some efficiency $\eta$ where $0 < \eta < 1$. Specifically, $W_L = W_i \eta$. The amount of work wasted is $W_i(1-\eta)$. In the simplest case, where heat-exchange fluid is drawn from an unpressurized source or reservoir, source pressure $P_s = 0$ psig, $W_L$ and $W_i$ are maximized, and the work wasted by the hydraulic pump $W_i(1-\eta)$ is maximum. If $\eta$ is constant or approximately constant and source pressure $P_s$ is increased, $W_L$ and $W_i$ are decreased and wasted work $W_i(1-\eta)$ is decreased.

The input-to-pump pressure $P_s$, of the heat-exchange fluid may be increased by obtaining the liquid as an output of the pneumatic chamber into which the liquid is being sprayed. That is, the heat-exchange liquid may be recycled by extracting it (at some output pressure $P'_s > 0$, equal to the present gas pressure in the pneumatic chamber) from the pneumatic chamber into which it has been sprayed, passing it via pipes through a heat exchanger to raise or lower its temperature, raising its pressure from arrival-at-pump pressure $P_s < P'_s$ to injection pressure $P_i$, and finally re-injecting the liquid into the chamber from where it came. Filters, valves, reservoirs, and other devices may be included in such a loop without changing its basic purpose and fall within the scope of embodiments of the invention described herein. Particularly if frictional losses in the heat exchanger and other devices that implement the recycling loop amount to less than the work saved at the pump, recycling heat-exchange fluid in this way will increase overall system efficiency.

The above-described mechanism for efficient pumping may be utilized with energy storage and recovery systems featuring one or more cylinder assemblies (i.e., assemblies having one or more closed chambers such as pneumatic, hydraulic, pneumatic/hydraulic cylinders) and/or pressure vessels for storage of compressed gas. A "cylinder assembly" may be a simple cylinder or include multiple cylinders, and may or may not have additional associated components (such as mechanical linkages among the cylinders). The mechanism may also be utilized with a variety of mechanical assemblies, e.g., one or more cylinder assemblies, pressure vessels, motors (e.g., rotary motors), and/or turbines. The mechanism may remove fluid from an outlet of the mechanical assembly at elevated pressure and reintroduce the fluid at slightly higher pressure at an inlet of the mechanical assembly. This removal and reintroduction of fluid may result in expedited heat transfer to working gas in the mechanical assembly. Moreover, all of the mechanisms described above for converting potential energy in compressed gas to electrical energy, including the heat-exchange mechanisms and power electronics described, may, if appropriately designed, be operated in reverse to store electrical energy as potential energy in compressed gas. Since the accuracy of this statement will be apparent to any person reasonably familiar with the principles of electrical machines, power electronics, pneumatics, and the principles of thermodynamics, the operation of these mechanisms to store energy rather than to recover energy from storage will not be described. Such operation is, however, contemplated and within the scope of the invention and may be straightforwardly realized without undue experimentation.

In one aspect, embodiments of the invention feature an energy storage and recovery system suitable for the efficient use and conservation of energy resources. The system includes or consists essentially of a mechanical assembly for expansion and/or compression of a gas, and, in fluid communication with the mechanical assembly, a circulation apparatus. The mechanical assembly is configured to receive a heat-transfer fluid for maintaining the gas at a substantially constant temperature during the expansion and/or compression. To increase efficiency of the expansion and/or compression, the circulation apparatus receives pressurized heat-transfer fluid from an outlet of the mechanical assembly at a first elevated pressure, boosts a pressure of the heat-transfer fluid to a second pressure larger than the first pressure, and returns heat-transfer fluid to an inlet of the mechanical assembly at a third pressure.

Embodiments of the invention may include one or more of the following in any of a variety of combinations. The third pressure may range from approximately the first pressure to approximately the second pressure. The circulation apparatus may include or consist essentially of a pumping cylinder and an actuator. The pumping cylinder may include or consist essentially of two separated chambers and a piston disposed within the pumping cylinder separating the chambers. The actuator may be coupled to the piston and may alternately drive the piston in two opposing directions, thereby alternately increasing the pressure within each of the two chambers. A manifold assembly (i.e., including or consisting essentially of one or more manifolds) may be (i) selectively fluidly connected to both chambers of the pumping cylinder, and (ii) selectively fluidly connected to the inlet and the outlet of the mechanical assembly, such that each chamber alternatively receives the heat-transfer fluid from the mechanical assembly at the first pressure and returns the heat-transfer fluid to the inlet of the mechanical assembly at the second pressure. The actuator may include or consist essentially of (i) a linear actuator or (ii) a servo motor and ball-screw actuator.

The system may include a heat exchanger for thermally conditioning the heat-transfer fluid during circulation of the heat-transfer fluid. A mechanism (e.g., a spray mechanism such as a spray head and/or a spray rod) may introduce the heat-transfer fluid into the mechanical assembly.

The mechanical assembly may include or consist essentially of a cylinder assembly having (i) two separated compartments and (ii) a movable boundary disposed within the cylinder assembly separating the compartments. One or both of the compartments may be pneumatic. One of the compartments may be hydraulic. The movable boundary may include or consist essentially of a piston and rod assembly, which may define a fluid passageway therethrough connected to the outlet of the cylinder assembly.

A vessel for storage of compressed gas may be selectively fluidly connected to the mechanical assembly. A second circulation apparatus may be in fluid communication with the vessel. The second circulation apparatus may receive pressurized heat-transfer fluid from an outlet of the vessel at a fourth elevated pressure, boost a pressure of the heat-transfer fluid to a fifth pressure larger than the third pressure, and return the heat-transfer fluid to an inlet of the vessel at a sixth pressure. The sixth pressure may range between approximately the fourth pressure and approximately the fifth pressure.

In another aspect, embodiments of the invention feature a pumping system that includes or consists essentially of a pumping cylinder, an actuator, and a manifold assembly. The pumping cylinder includes or consists essentially of two separated chambers and a piston disposed within the pumping cylinder separating the chambers. The actuator is coupled to the piston and alternately drives the piston in two opposing directions, thereby alternately increasing a pressure within each of the two chambers. The manifold assembly is fluidly connected to both chambers of the pumping cylinder and selectively fluidly connectable to first and second fluid reservoirs such that each chamber alternately receives fluid from the first reservoir at a first pressure and returns fluid to the second reservoir at a second pressure higher than the first pressure.

Embodiments of the invention may include one or more of the following in any of a variety of combinations. The actuator may include or consist essentially of (i) a linear actuator or (ii) a servo motor and ball-screw actuator. The manifold assembly may include or consist essentially of two manifolds each comprising, mounted in parallel, two check valves mounted in opposing directions. Each check valve may include or consist essentially of a spring-return check valve. The pumping cylinder and the actuator may be mounted on a platform.

In yet another aspect, embodiments of the invention feature an energy storage system suitable for the efficient use and conservation of energy resources. The system includes or consists essentially of a vessel for storage of compressed gas and a circulation apparatus in fluid communication with the vessel. The vessel is configured to receive a heat-transfer fluid for thermally conditioning the gas. The circulation apparatus receives pressurized heat-transfer fluid from an outlet of the vessel at a first elevated pressure, boosts a pressure of the heat-transfer fluid to a second pressure larger than the first pressure, and returns heat-transfer fluid to an inlet of the vessel at a third pressure.

Embodiments of the invention may include one or more of the following in any of a variety of combinations. The third pressure may range between approximately the first pressure and approximately the second pressure. The circulation apparatus may include or consist essentially of a pumping cylinder and an actuator. The pumping cylinder may include or consist essentially of two separated chambers and a piston disposed within the pumping cylinder separating the chambers. The actuator may be coupled to the piston and may alternately drive the piston in two opposing directions, thereby alternately increasing the pressure within each of the two chambers. A manifold assembly (i.e., including or consisting essentially of one or more manifolds) may be (i) selectively fluidly connected to both chambers of the pumping cylinder, and (ii) selectively fluidly connected to the inlet and the outlet of the vessel, such that each chamber alternatively receives heat-transfer fluid from the vessel at the first pressure and returns heat-transfer fluid to the inlet of the vessel at the second pressure. The actuator may include or consist essentially of (i) a linear actuator or (ii) a servo motor and ball-screw actuator.

The system may include a heat exchanger for thermally conditioning the heat-transfer fluid during circulation of the heat-transfer fluid. A mechanism (e.g., a spray mechanism such as a spray head and/or a spray rod) may introduce the heat-transfer fluid into the vessel.

In a further aspect, embodiments of the invention feature an energy storage system suitable for the efficient use and conservation of energy resources. The system includes or consists essentially of a vessel for storage of compressed gas, a heat exchanger for thermally conditioning the gas, and a circulation apparatus. The heat exchanger is typically external to the vessel. The circulation apparatus receives pressurized gas from an outlet of the vessel at a first elevated pressure, boosts a pressure of the gas to a second pressure larger than the first pressure, circulates the gas through the heat exchanger to thermally condition the gas, and returns gas to an inlet of the vessel at a third pressure.

Embodiments of the invention may include one or more of the following in any of a variety of combinations. The third pressure may range between approximately the first pressure and approximately the second pressure. The circulation apparatus may include or consist essentially of a pumping cylinder and an actuator. The pumping cylinder may include or consist essentially of two separated chambers and a piston disposed within the pumping cylinder separating the chambers. The actuator may be coupled to the piston and may alternately drive the piston in two opposing directions, thereby alternately increasing the pressure within each of the two chambers. A manifold assembly (i.e., including or consisting essentially of one or more manifolds) may be (i) selectively fluidly connected to both chambers of the pumping cylinder, and (ii) selectively fluidly connected to the inlet and the outlet of the vessel, such that each chamber alternatively receives gas from the vessel at the first pressure and returns gas to the inlet of the vessel at the second pressure. The actuator may include or consist essentially of (i) a linear actuator or (ii) a servo motor and ball-screw actuator.

In yet a further aspect, embodiments of the invention feature a method of energy storage and recovery suitable for the efficient use and conservation of energy resources. Gas is stored, expanded, and/or compressed at an elevated pressure, and a heat-transfer fluid is circulated through the gas at the elevated pressure. The heat-transfer fluid is compressed to a second pressure higher than the elevated pressure, and, thereafter, heat-transfer fluid is introduced into the gas at a pressure ranging from approximately the elevated pressure to approximately the second pressure to thermally condition the gas. Embodiments of the invention may include one or more of the following in any of a variety of combinations. The gas may be stored, expanded, and/or compressed within a cylinder assembly. The heat-transfer fluid may be thermally conditioned outside of the cylinder assembly and/or after it is compressed. Between being compressed and being introduced into the gas, the pressure of the heat-transfer fluid may drop from approximately the second pressure to approximately the elevated pressure. Thermally conditioning the gas may include or consist essentially of heating the gas during expansion thereof and/or cooling the gas during compression thereof. Thermally conditioning the gas may include or consist essentially of pre-cooling the gas during storage thereof, and the gas may also be compressed. Thermally conditioning the gas may include or consist essentially of pre-heating the gas during storage thereof, and the gas may also be expanded. The heat-transfer fluid may be compressed in a pumping system that includes or consists essentially of a pumping cylinder and an actuator. The pumping cylinder may include or consist essentially of two separated chambers and a piston disposed within the pumping cylinder separating the chambers. The actuator may be coupled to the piston and may alternately drive the piston in two opposing directions, thereby alternately increasing a pressure within each of the two chambers.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. Herein, the terms "liquid" and "water" interchangeably connote any mostly or substantially incompressible liquid, the terms "gas" and "air" are used interchangeably, and the term "fluid" may refer to a liquid or a gas unless otherwise indicated. As used herein, the terms "approximately" and "substantially" mean ±10%, and, in some embodiments, ±5%. Note that as used herein the terms "pipe," "piping" and the like refer to one or more conduits capable of carrying gas or liquid between two points. Thus, the singular term should be understood to extend to a plurality of parallel conduits where appropriate. As utilized herein, "elevated pressure" refers to a pressure above 0 psig, and "high pressure" refers to a pressure above approximately 250 psig, e.g., above approximately 1,000 psig, approximately 3,000 psig, or even higher. "Pressurized" fluids and gases are typically at elevated pressures, and may even be at high pressures.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1A:
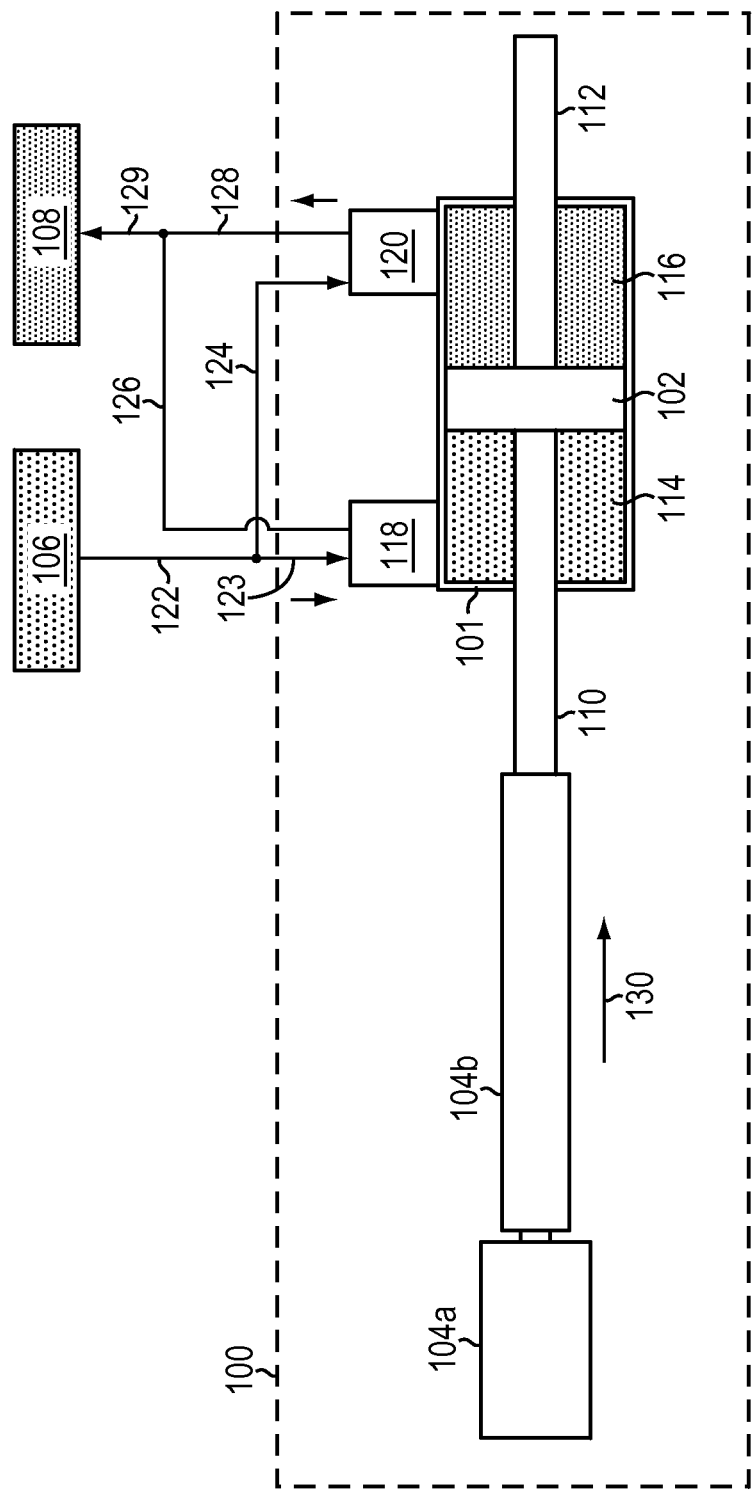
FIG. 1A is a schematic diagram of a system for the efficient pumping of a high-pressure fluid in accordance with various embodiments of the invention.

FIG. 1A is a schematic diagram of a high-pressure pumping system 100 in accordance with various embodiments of the invention. The system 100 includes or consists essentially of a cylinder housing 101 containing a piston 102, a linear actuator 104 (shown as including or consisting essentially of a servo motor 104a and ball-screw actuator 104b), rods 110, 112; and valve manifolds 118, 120. System 100 may be connected to a pair of fluid bodies 106, 108 via pipes 122, 123, 124, 126, 128, and 129.

The piston 102 divides the cylinder housing 101 into a first chamber 114 and a second chamber 116, and slidably translates along the inner surfaces of the cylinder housing 101. In the embodiment shown, each of the rods 110, 112 is coupled to an opposite side of the piston 102 such that their axes align and each rod 110, 112 extends through seals (not shown) and beyond the boundaries (e.g., end caps) of the cylinder housing 101 (i.e., a double-rodded configuration). In alternative embodiments, two single-acting, single-rodded cylinders with a common rod are used in a similar fashion. As the piston 102 moves along the length of the cylinder housing 101, rod 112 feeds out of the cylinder housing 101, while the other rod 110 feeds in. Rods 110 and 112 are not necessarily two separate rods, but may be a single rod attached, e.g., near its midpoint, to the piston. This arrangement of cylinder housing 101, piston 102, and rods 110, 112 is capable of motion in both directions.

The linear actuator 104 imparts linear motion to the piston 102 through the rod 110. For example, a rotary electric servo motor 104a may be attached to a ball-screw actuator 104b to convert rotary motion to linear motion. Herein, "ball-screw actuator" denotes a screw embedded in a fixed sheath; between the external thread of the screw and the complementary internal thread of the sheath are ball bearings that reduce friction and transmit load as the screw turns. Alternatively, a linear electric motor may be used to apply force to the rod. Herein, "linear motor" denotes a device that exploits Faraday's Law to convert electromagnetic force in a circuit to a mechanical force acting along the axis of the device. Other devices (e.g., acme screw, power screw, rack and pinion), mechanical or electrical, may also be used to apply force to the rod 110. Any device used for this purpose is generally able to apply force in both directions. Herein, a device that applies force to the rod 110, whatever its nature, is referred to as an "actuator." Herein, the rod 110 that is attached to the actuator 104 is referred to as the "working rod."

Fluid bodies 106, 108 are sources of high-pressure fluids. In one embodiment, the first fluid body 106 is a source of heat-transfer fluid resident in a pneumatic cylinder and the second fluid body 108 is a heat-transfer fluid outputted by the cylinder housing 101 for delivery to the pneumatic cylinder. Generally, the first fluid body 106 is at a lower pressure ($P_1$, e.g., approximately 3,000 psig) than the higher-pressure second fluid body 108 ($P_2$, e.g., approximately 3,010 psig). The first fluid body 106 may represent the inlet state and the second fluid body 108 may represent the outlet state of the pumping system 100. The fluid bodies 106, 108 communicate with the first and second chambers 114, 116 of the cylinder housing 101 via an arrangement of external lines or pipes 122, 123, 124, 126, 128, and 129 in the configuration shown in FIG. 1A.

Figure 1B:
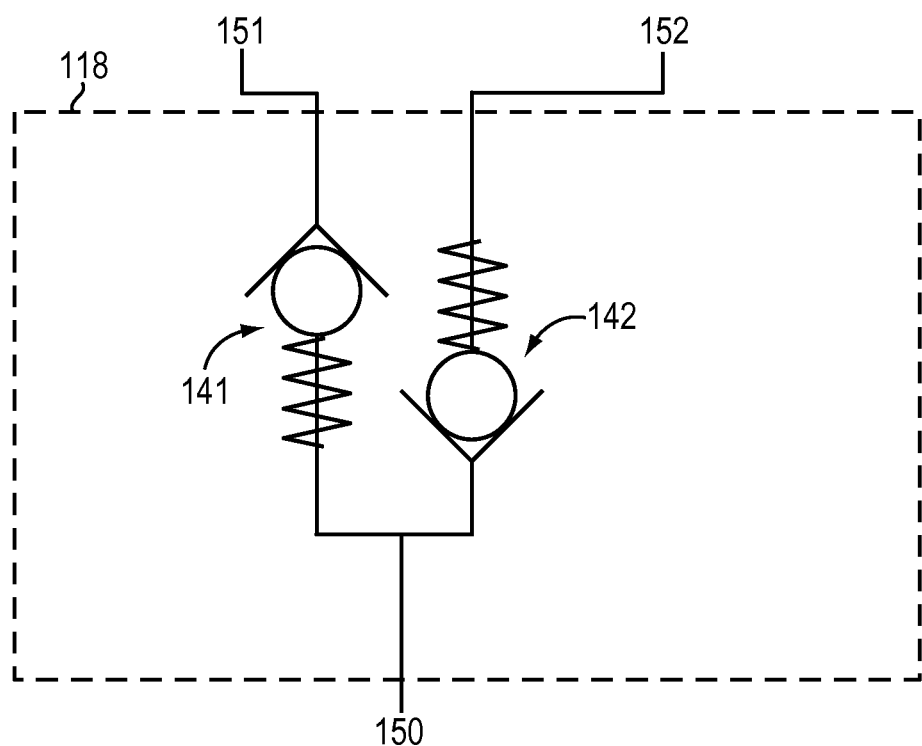
FIG. 1B is a schematic of a manifold and valve assembly arrangement for use in the system of FIG. 1A.

First and second manifold and valve assemblies (valve manifolds) 118, 120 control the flow of fluid into and out of the chambers 114, 116. (As used herein, the term manifold assembly refers to an assembly including one or more manifolds, e.g., valve manifolds 118, 120.) Each valve manifold 118, 120 includes a valve operating as an inlet and a valve operating as an outlet, as depicted for the first valve manifold 118 in FIG. 1B, with check valves 141, 142 (each of which may include or consist essentially of a spring-return check valve, as shown). The two check valves 141, 142 are typically oriented in opposing directions and attached in parallel via a common pipe 150 to a port disposed in the cylinder housing 101 (the first chamber 114 for the valve manifold 118, the second chamber 116 for the valve manifold 120). Check valve 141 is in communication with the lower-pressure ($P_1$) source 151 (fluid body 106 in FIG. 1A) via the pipes 122, 123 (or the pipes 122, 124 for the second valve manifold 120) such that fluid is admitted when pressure in the pipeline 150 drops below the lower pressure $P_1$ due to movement of the piston 102, acting as a refill valve for the pump chamber to which the pipeline 150 is attached. Check valve 142 is attached to the higher-pressure ($P_2$) body 152 (fluid body 108 in FIG. 1A) via the pipes 126, 129 (or the pipes 128, 129 for the second valve manifold 120) such that the fluid is allowed to flow out (i.e., to the body 152) when pressure in the pipe 150 rises above the higher pressure $P_2$. Besides check valves opened or closed by pressurized flow, the valve manifolds 118, 120 may include or consist essentially of electrically, pneumatically, manually, and/or hydraulically actuated valves.

In the operating state shown in FIG. 1A, the actuator 104 is acting on the rod 110 and causing it, the piston 102, and the rod 112 to move in the direction indicated by the arrow 130. Fluid in the second chamber 116 is compressed and raised to a pressure $P_2'$, slightly higher than the pressure $P_2$ of the fluid body 108. The fluid in the second chamber 116 flows through the second valve manifold 120 into the pipes 128, 129 to the fluid body 108. The fluid does not flow through the pipe 126 in this operating state, as check valve 142 prevents the flow of fluid.

Simultaneous with the raising of the pressure of the fluid in chamber 116 in the operating state shown in FIG. 1A, the pressure of the first chamber 114 is lowered by the action of the piston to $P_1'$, slightly lower than the pressure $P_1$ of the fluid body 106, causing the fluid to flow from the fluid body 106 through pipes 122 and 123 and through the valve manifold 118 into the first chamber 114 at a rate substantially equal to the rate at which the fluid is exiting the second chamber 116. (If the fluid being pumped is a liquid, the force exerted on rod 110 preferably does not cause cavitation anywhere in the system.) Fluid does not flow through pipe 124 in this operating state.

Figure 2A:
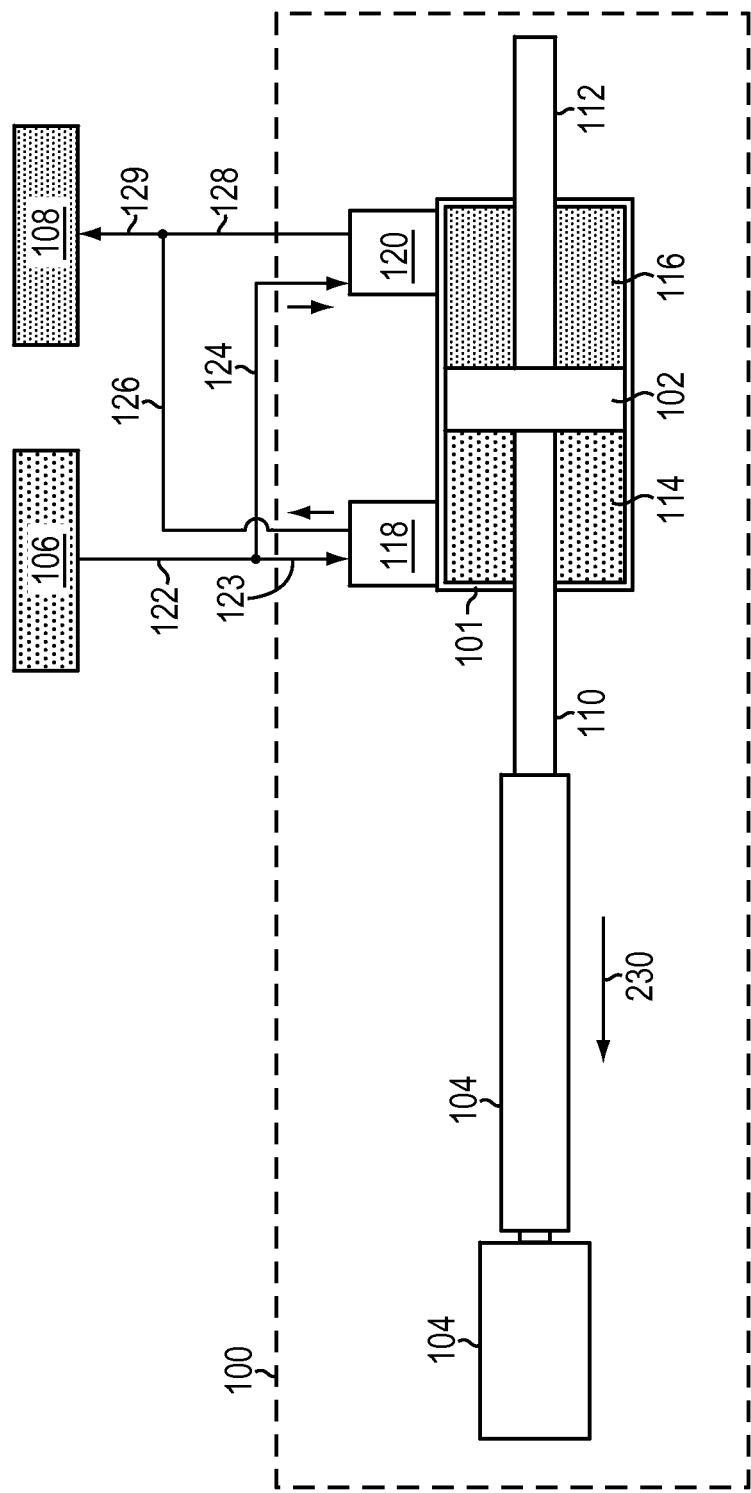
FIG. 2A shows the system of FIG. 1A in a different phase of operation.

Reference is now made to FIG. 2A, which shows the illustrative embodiment of FIG. 1A in a second operating state. The actuator 104 reverses and begins to pull the rod 110, the attached piston 102, and the other rod 112 in the opposite direction (i.e., toward the actuator 104, as shown by arrow 230). At the beginning of this reverse stroke, the valves associated with each end of the cylinder housing 101 are set to new states, whether by external controls or by an intrinsic mechanism. Fluid in the first chamber 114 is raised to a pressure $P_2'$, slightly higher than the pressure $P_2$ of the fluid 108, and flows through the valve manifold 118 and the pipes 126, 129 to the fluid body 108. Fluid does not flow through pipe 128 in this operating state.

Simultaneously, the pressure of the second chamber 116 is lowered by the action of the piston to $P_1'$, slightly lower than the pressure $P_1$ of the fluid body 106, causing fluid to flow from the fluid body 106 through the pipes 122, 124 and through the valve manifold 120 into the second chamber 116 at a rate substantially equal to the rate at which fluid is exiting the first chamber 114. Fluid does not flow through pipe 123 in this operating state.

The difference between the inlet pressure $P_1$ and the outlet pressure $P_2$ is directly proportional to the magnitude of the force exerted by the actuator 104 on the working rod 110. Although no force is applied to the non-working rod 112 (i.e., the rod distal to the actuator 104) in the illustrated embodiment, it serves to make the area of the piston 102 acting on the fluid being pressurized substantially the same regardless of stroke direction. The pump 100 thus develops substantially identical pressure at its outlet regardless of stroke direction. A single-rodded cylinder may also be used in the identical setup with varying forces and/or pressures during different stroke directions.

Volumetric efficiency of the pump approaches 100%, and its mechanical efficiency may be determined by seal frictions, turbulence, and actuator efficiency. All components needed for the construction of the pump 100 in practice—for example, servo motor, ball screw actuator, cylinder-and-piston—are commonly known in the art. The accuracy of this statement will be apparent to any person familiar with the arts of mechanical engineering, electrical machines, and hydraulics. Embodiments of the invention have been described herein in terms of "high" input and output pressure but are, strictly speaking, independent of input pressure, from 0 psig up to the tolerance of the weakest component.

Figure 2B:
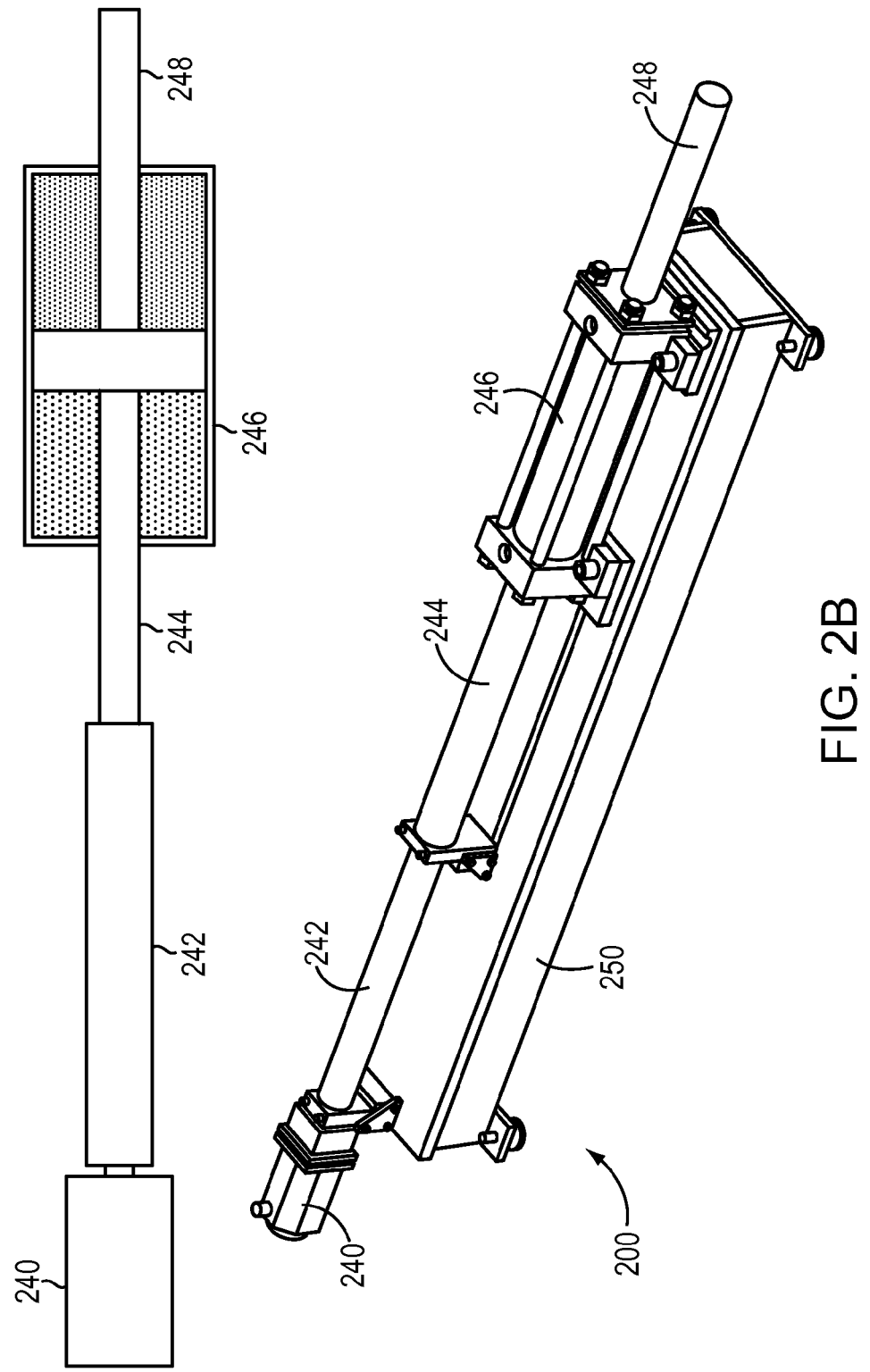
FIG. 2B shows an exemplary embodiment of the system of FIG. 1A.

Reference is now made to FIG. 2B, which depicts an exemplary embodiment of a pump 200 in accordance with various embodiments of the invention. As shown, an electric servo motor 240 drives a ball-screw linear actuator 242, which pushes on one rod 244 (in a protective sheath) of a two-chamber, two-rodded cylinder 246 whose other rod 248 (also in a protective sheath) protrudes from the end of the pump 200. All components may be mounted on a platform 250 (e.g., a substantially rigid substrate such as a steel beam) to prevent deformation of the arrangement from the forces generated during operation. Other mounting arrangements, such as face-mounting of servo motor 240 to the actuator 242, may also be employed.

Figure 3:
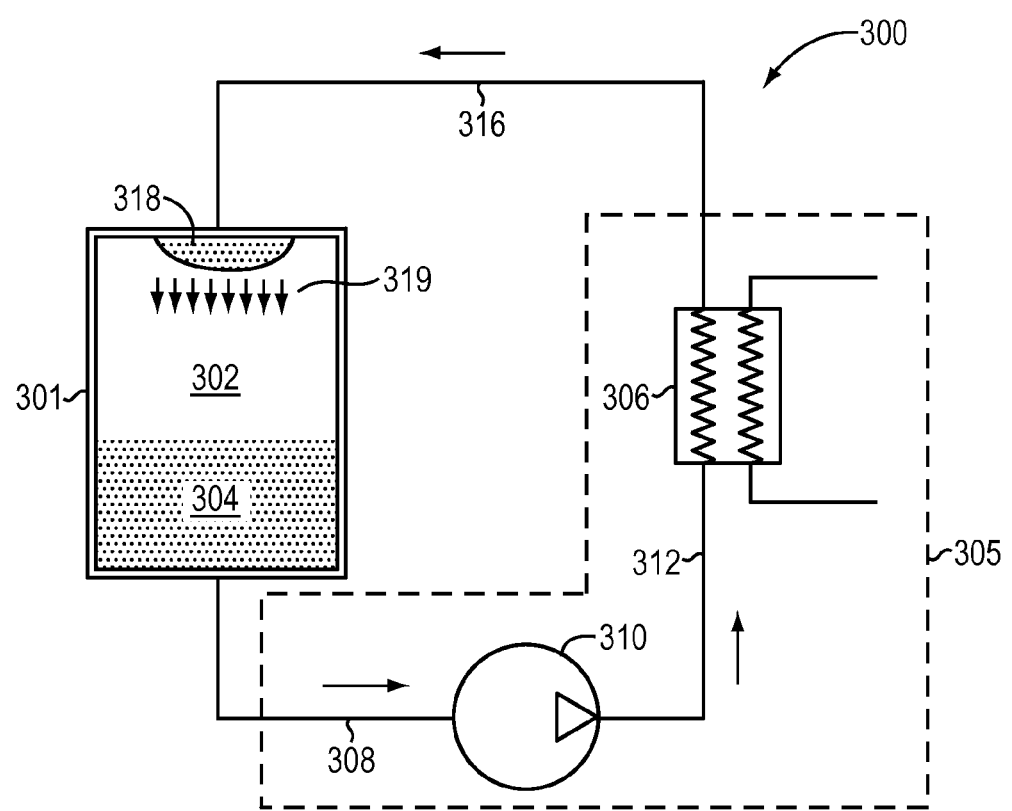
FIG. 3 is a schematic diagram of heat-transfer fluid being circulated efficiently through a vessel storing gas at high pressure, in accordance with various embodiments of the invention.

FIG. 3 depicts an illustrative application of an embodiment of the invention in an energy-storage system 300. In this application, the system 300 includes or consists essentially of a vessel 301 for the storage of compressed gas (which may correspond to a cylinder or cylinder assembly without a movable boundary mechanism therewithin and thus including only a single compartment), as well as a heat-transfer subsystem 305. The heat-transfer subsystem 305 includes or consists essentially of a heat exchanger 306 and a booster pump assembly 310 (which preferably corresponds to the pump 100 as described above). Vessel 301 may also or alternatively include other types of "containers" for compressed gas, including pipelines, bladders, caverns and other underground features, and various types (e.g., bags, bladders, domes) of underwater storage.

Operation of the system 300 may begin with the vessel 301 filled partly with a gas 302 at a high pressure $P_s$, (e.g., approximately 3,000 psig) and partly with a heat-transfer fluid 304, also at pressure $P_s$. The heat-transfer fluid 304 drains through an outlet of the vessel 301 and flows through a pipe 308 communicating with the pump 310, symbolized by a generic pump symbol. The pump 310 compresses and outputs the heat-transfer fluid 304 at a pressure $P_i'$ somewhat higher than $P_s$ (e.g., approximately 3,015 psig). The compressed heat-transfer fluid 304 is sent through a pipe 312 to the heat exchanger 306, where its temperature is raised or lowered, and then through a pipe 316 to a spray mechanism 318 disposed inside the vessel 301. The compressed heat-transfer fluid 304 is typically introduced into the vessel 301 via the spray mechanism 318 at a different temperature than the gas 302 and, therefore, transfers thermal energy to or from the heat transfer fluid 304. Due to pressure drops in the pipes 312, 316, the heat exchanger 306, and the openings in the spray mechanism 318, the heat-transfer fluid 304 exits the spray mechanism 318 at a pressure $P_i$ (e.g., approximately 3,000 psig) that is lower than the pump output pressure $P_i'$ (e.g., approximately 3,015 psig) and essentially equal to the pressure $P_s$ (e.g., approximately 3,000 psig) within the vessel 301. Such a circulating system has a higher efficiency than a system that pumps liquid from a low intake pressure (e.g., 0 psig) to $P_i'$. Although spray mechanism 318 is depicted as a spray head disposed at one end of vessel 301, it may be supplemented or replaced by a perforated spray rod disposed within vessel 301 (e.g., substantially along the entire long axis of vessel 301).

In another embodiment, pump 310 circulates and boosts the pressure of gas 302 directly, and gas 302 is itself thermally conditioned by heat exchanger 306, in combination with or rather than thermal conditioning via introduction of heat-transfer fluid 304. In such embodiments, heat-transfer fluid 304 and/or spray mechanism 318 may be absent from vessel 301. Pump 310 may receive the pressurized gas 302 from the outlet of the vessel 301 at elevated pressure, boost the pressure of the gas 302, circulate the gas 302 through the heat exchanger 306 to thermally condition the gas 302, and return the gas 302 to the inlet of the vessel 301. Thus, the system has a higher efficiency due to the circulation and thermal conditioning of the gas 302 at elevated or high pressures.

The thermal conditioning of the gas 302 within vessel 301 may occur either as pre-heating prior to expansion or pre-cooling prior to compression in an energy storage and recovery system described herein (e.g., system 400 detailed below). As such, vessel 301 may be selectively fluidly connected (via, e.g., one or more valves not shown) to one or more cylinder assemblies (e.g., pneumatic and/or pneumatic/hydraulic cylinders) such that the pre-heated or pre-cooled gas is introduced therein for expansion or compression.

Figure 4:
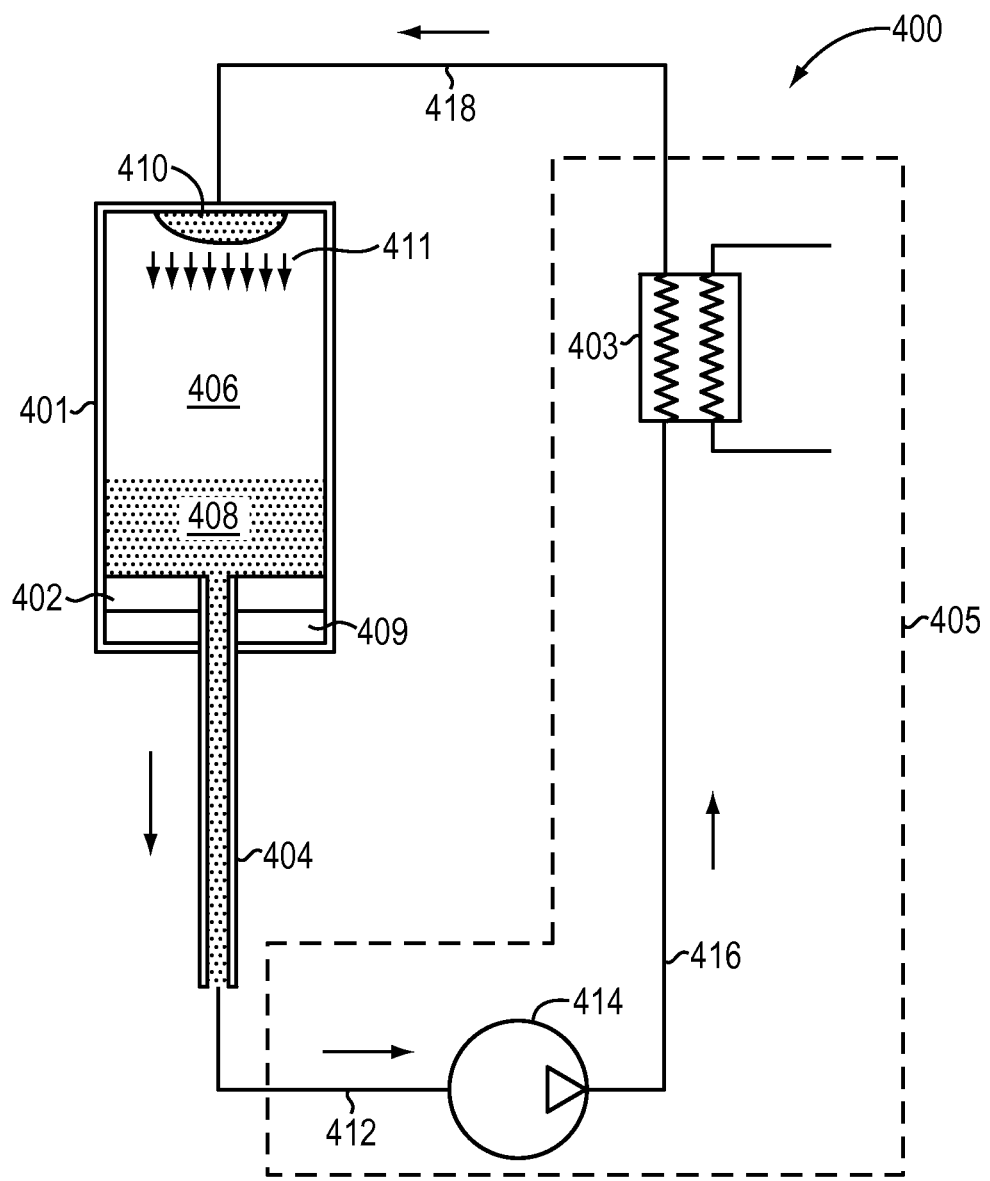
FIG. 4 is a schematic diagram of heat-transfer fluid being circulated efficiently through a pneumatic cylinder, in accordance with various embodiments of the invention.

Reference is now made to FIG. 4, which depicts another illustrative application of the invention in an energy storage and recovery system 400. The system 400 includes or consists essentially of a pneumatic cylinder assembly 401 and a heat transfer subsystem 405. The heat transfer subsystem 405 includes or consists essentially of a heat exchanger 403 and a booster pump assembly 414 (which preferably corresponds to the pump 100 described above).

The pneumatic cylinder assembly 401 contains a piston 402 slidably disposed therein with a center-drilled rod 404 defining a fluid passageway extending from the piston 402. The rod 404 is also attached to, e.g., a mechanical load that is not depicted. In an initial state, the pneumatic cylinder assembly 401 may contain a gas 406 (introduced to the pneumatic cylinder assembly 401 via valves and pipes that are not shown) and a heat-transfer fluid 408 at a high pressure $P_s$ (e.g., approximately 3,000 psig). As the gas 406 expands, it performs work on the piston 402. The heat-transfer fluid 408 flows through the center-drilled rod 404 and through a pipe 412 to the pump 414 (any fluid 409 on the other side of the piston 402 may flow through other valves and pipes that are not shown). The heat-transfer fluid 408 is also drawn to the pump 414 when lower pressure is generated during its operation. The pump 414 compresses and raises the pressure of the heat transfer fluid 408 to a pressure $P_i'$ somewhat higher than $P_s$. (e.g., approximately 3,015 psig). The compressed heat-transfer fluid 408 is then sent through a pipe 416 to the heat exchanger 403, where its temperature is altered, and then through a pipe 418 to a spray mechanism 410 disposed within the pneumatic cylinder assembly 401. In one embodiment, the spray 411 of the heat-transfer fluid 408 is introduced into the pneumatic cylinder assembly 401 at a higher temperature than the gas 406 and, therefore, transfers thermal energy to the gas 406 and increases the amount of work done on the piston 402. In an alternative embodiment, the heat transfer fluid 408 is introduced at lower temperature than the gas 406 when the pneumatic cylinder assembly 401 is operated as a compressor. Due to pressure drops in the pipes 416, 418, the heat exchanger 403, and the openings of the spray mechanism 410, the heat-transfer fluid 408 generally exits the spray mechanism 410 at a pressure $P_i$ (e.g., approximately 3,000 psig) that is lower than the pump output pressure $P_i'$ (e.g., approximately 3,015 psig) and essentially equal to the pressure $P_s$ (e.g., approximately 3,000 psig) within the pneumatic cylinder assembly 401. Such a circulating system typically has higher efficiency than a system which pumps liquid from a low intake pressure (e.g., approximately 0 psig) to $P_i'$. Embodiments of the present invention may be utilized to inject heat-transfer liquid into one or more chambers of a pneumatic cylinder assembly, as described in U.S. patent application Ser. No. 12/690,513 (the '513 application), the entire disclosure of which is incorporated by reference herein. Although spray mechanism 410 is depicted as a spray head disposed at one end of pneumatic cylinder assembly 401, it may be supplemented or replaced by a perforated spray rod disposed within pneumatic cylinder assembly 401 (e.g., substantially along the entire long axis of pneumatic cylinder assembly 401).

Figure 5:
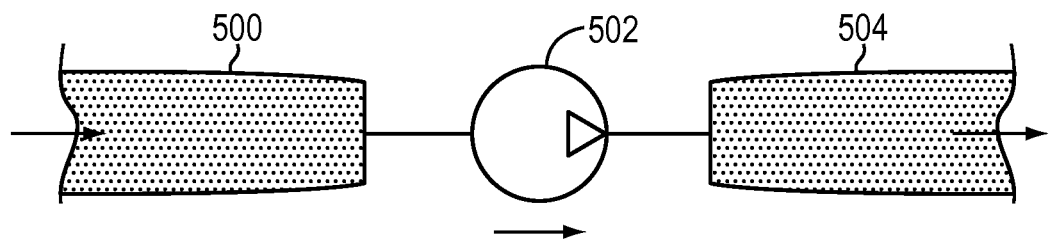
FIG. 5 is a schematic diagram in which pressure in a pipeline carrying fluid at high pressure is boosted, in accordance with various embodiments of the invention.

Reference is now made to FIG. 5, which depicts another illustrative application of various embodiments of the present invention. A pipeline 500 contains fluid at a pressure $P_s$. Due to frictional losses and work performed in creating fluid motion, this pressure $P_s$ is lower than the injection pressure $P_i$ at the inlet of the pipeline 500. In order to continue pumping the fluid and maintaining pressure in the pipe, a pump 502 (preferably corresponding to the pump 100 in FIG. 1) may be installed as a booster pump, as shown in FIG. 5. The pump 502 efficiently takes inlet fluid from the pipeline 500 at pressure $P_s$ and outputs fluid at pressure $P_i$ for injection into a downstream length of a pipeline 504.

Generally, the systems described herein may be operated in both an expansion mode and in the reverse compression mode as part of a full-cycle energy storage system with high efficiency. For example, the systems may be operated as both compressor and expander, storing electricity in the form of the potential energy of compressed gas and producing electricity from the potential energy of compressed gas. Alternatively, the systems may be operated independently as compressors or expanders.

In addition, the systems described above, and/or other embodiments employing liquid-spray heat exchange or external gas heat exchange (as detailed above), may draw or deliver thermal energy via their heat-exchange mechanisms to external systems (not shown) for purposes of cogeneration, as described in the '513 application.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of energy storage and recovery, the method comprising:
   at least one of storing, expanding, or compressing a gas at an elevated pressure within a cylinder assembly having an inlet and an outlet;
   circulating a heat-transfer fluid through the gas at the elevated pressure;
   increasing a pressure of the heat-transfer fluid to a second pressure higher than the elevated pressure with a pumping system; and
   thereafter, introducing heat-transfer fluid into the gas at a pressure ranging from approximately the elevated pressure to approximately the second pressure to thermally condition the gas,
   wherein the pumping system comprises a pumping cylinder comprising two separated chambers selectively fluidly connected to the inlet and the outlet of the cylinder assembly.

2. The method of claim 1, further comprising thermally conditioning the heat-transfer fluid outside of the cylinder assembly.

3. The method of claim 2, wherein the heat-transfer fluid is thermally conditioned after it is compressed.

4. The method of claim 1, wherein, between the pressure of the heat-transfer fluid being increased and the heat-transfer fluid being introduced into the gas, the pressure of the heat-transfer fluid drops from approximately the second pressure to approximately the elevated pressure.

5. The method of claim 1, wherein thermally conditioning the gas comprises heating the gas during expansion thereof.

6. The method of claim 1, wherein thermally conditioning the gas comprises cooling the gas during compression thereof.

7. The method of claim 1, wherein thermally conditioning the gas comprises pre-cooling the gas during storage thereof, and further comprising compressing the gas.

8. The method of claim 1, wherein thermally conditioning the gas comprises pre-heating the gas during storage thereof, and further comprising expanding the gas.

9. The method of claim 1, wherein (i) the pumping cylinder comprises a piston disposed within the pumping cylinder separating the chambers, and (ii) the pumping system comprises an actuator, coupled to the piston, for alternately driving the piston in two opposing directions, thereby alternately increasing a pressure within each of the two chambers.

10. The method of claim 9, wherein a manifold assembly selectively fluidly connects both chambers of the pumping cylinder to the inlet and the outlet of the cylinder assembly, such that each chamber alternatively (i) receives heat-transfer fluid from the cylinder assembly and (ii) returns heat-transfer fluid to the cylinder assembly.

11. The method of claim 1, wherein the cylinder assembly comprises (i) two separated compartments and (ii) a moveable boundary disposed within the cylinder assembly separating the compartments and comprising a piston and rod assembly defining a fluid passageway therethrough connected to the outlet of the cylinder assembly.

12. The method of claim 1, wherein the second pressure is at least 10 psi higher than the elevated pressure but no more than 50 psi higher than the elevated pressure.

13. The method of claim 1, wherein the elevated pressure is at least 250 psig.

14. The method of claim 1, wherein the elevated pressure is at least 1000 psig.

15. The method of claim 1, wherein the elevated pressure is at least 3000 psig.

16. A method of energy storage and recovery, the method comprising:
   at least one of storing, expanding, or compressing a gas at an elevated pressure within a mechanical assembly;
   circulating a heat-transfer fluid through the gas at the elevated pressure;
   increasing a pressure of the heat-transfer fluid to a second pressure higher than the elevated pressure with a pumping system; and
   thereafter, introducing heat-transfer fluid into the gas at a pressure ranging from approximately the elevated pressure to approximately the second pressure to thermally condition the gas,
   wherein the pumping system comprises (i) at least two pumping cylinders, each pumping cylinder comprising (a) two separated chambers selectively fluidly connected to an inlet and an outlet of the mechanical assembly, and (b) a piston disposed within the pumping cylinder separating the chambers, and (ii) an actuator, coupled to a piston, for alternately driving the piston in two opposing directions, thereby alternately increasing a pressure within each of the two chambers separated by the piston.

17. The method of claim 16, wherein the mechanical assembly comprises (i) a cylinder assembly comprising (a) two separated compartments and (b) a moveable boundary disposed within the cylinder assembly separating the compartments, and (ii) a storage reservoir for storage of compressed gas.

* * * * *